US012609900B1

(12) United States Patent
Lim

(10) Patent No.: US 12,609,900 B1
(45) Date of Patent: Apr. 21, 2026

(54) DATA FORWARDING USING QUEUES CLASSIFIED FOR COMPREHENSIVE INFOTAINMENT SERVICES IN VNDN ENVIRONMENT INCLUDING AUTONOMOUS VEHICLES, AND ADAPTIVE DATA FORWARDING METHOD AND SYSTEM FOR SERVICES

(71) Applicant: HOSEO UNIVERSITY ACADEMIC COOPERATION FOUNDATION, Chungcheongnam-do (KR)

(72) Inventor: Huhnkuk Lim, Daejeon (KR)

(73) Assignee: HOSEO UNIVERSITY ACADEMIC COOPERATION FOUNDATION, Chungcheongnam-do (KR)

( * ) Notice: Subject to any disclaimer, the term of this patent is extended or adjusted under 35 U.S.C. 154(b) by 0 days.

(21) Appl. No.: 19/407,216

(22) Filed: Dec. 3, 2025

(30) Foreign Application Priority Data

Jun. 2, 2025 (KR) ........................ 10-2025-0072354
Jun. 2, 2025 (KR) ........................ 10-2025-0072370

(51) Int. Cl.
| | |
|---|---|
| *H04L 47/62* | (2022.01) |
| *H04L 47/2441* | (2022.01) |
| *H04W 36/30* | (2009.01) |
| *H04W 64/00* | (2009.01) |

(52) U.S. Cl.
CPC ........ *H04L 47/623* (2013.01); *H04L 47/2441* (2013.01); *H04W 36/304* (2023.05); *H04W 64/00* (2013.01)

(58) Field of Classification Search
CPC .. H04W 36/304; H04W 64/00; H04L 47/623; H04L 47/2441
See application file for complete search history.

(56) References Cited

U.S. PATENT DOCUMENTS 12,120,550 B2 * 10/2024 Jha ...................... H04L 41/5022

OTHER PUBLICATIONS

Inayat Ali et al., "NameCent: Name Centrality-Based Data Broadcast Mitigation in Vehicular Named Data Networks", IEEE Access, Dec. 6, 2021, vol. 9, pp. 162438-162447, DOI: 10.1109/ACCESS.2021.3133016.
Rui Hou et al., "Data Forwarding Scheme for Vehicle Tracking in Named Data Networking", IEEE Trans., May 18, 2021, vol. 70, No. 7, pp. 6684-6695, DOI: 10.1109/TVT.2021.3081448.

* cited by examiner

*Primary Examiner* — Elton Williams
(74) *Attorney, Agent, or Firm* — The PL Law Group, PLLC

(57) ABSTRACT
A method for performing data forwarding using queues classified for comprehensive infotainment services by an autonomous vehicle or a road side unit (RSU) in a vehicular named data networking (VNDN) environment including autonomous vehicles includes generating or receiving a data packet by the autonomous vehicle or road side unit (RSU), placing the data packet, according to a class attribute included in the data packet, into a separate queue classified based on the class attribute, computing a current node weight (CNW) for the data packet and including the computed weight value in a weight attribute of the data packet, determining a forwarding order of the data packet according to the computed current node weight, and forwarding the data packet according to the determined order.

13 Claims, 20 Drawing Sheets

Figure 4:
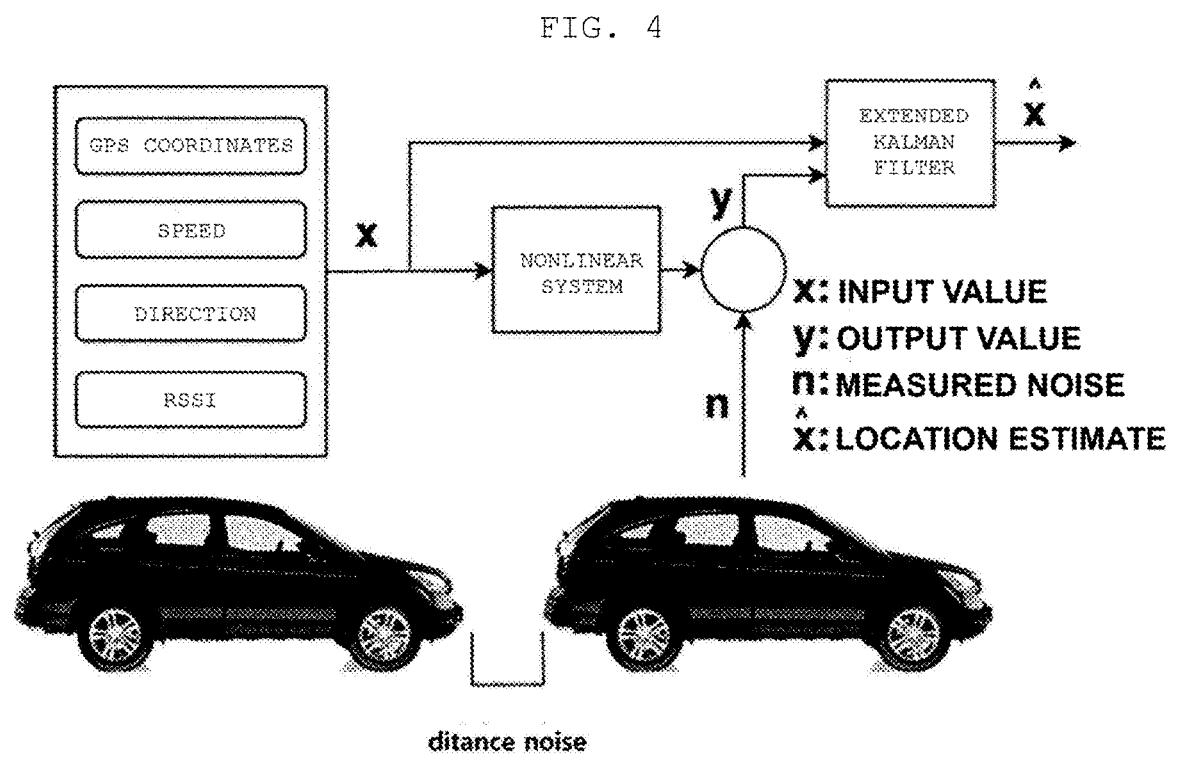

GPS COORDINATES

SPEED

DIRECTION

RSSI x

NONLINEAR SYSTEM

EXTENDED KALMAN FILTER $\hat{x}$ y n x: INPUT VALUE
y: OUTPUT VALUE
n: MEASURED NOISE
$\hat{x}$: LOCATION ESTIMATE ditance noise

DATA FORWARDING USING QUEUES CLASSIFIED FOR COMPREHENSIVE INFOTAINMENT SERVICES IN VNDN ENVIRONMENT INCLUDING AUTONOMOUS VEHICLES, AND ADAPTIVE DATA FORWARDING METHOD AND SYSTEM FOR SERVICES

CROSS REFERENCE TO RELATED APPLICATIONS AND CLAIM OF PRIORITY

This application claims the benefit under 35 USC § 119 of Korean Patent Nos. 10-2025-0072370 filed on Jul. 2, 2025, and 10-2025-0072354 filed on Jul. 2, 2025, in the Korean Intellectual Property Office, the entire disclosure of which are incorporated herein by reference for all purposes.

BACKGROUND

1. Field of the Invention

The present invention relates to data forwarding using queues classified for comprehensive infotainment services in a VNDN environment including autonomous vehicles, and to an adaptive data forwarding method and system for such services, and more specifically, to an intelligent adaptive forwarding method which provides an enhanced weighted fair queuing (EWFQ) based on fuzzy logic to realize reliable quality of service (QoS) differentiation for various infotainment services having different priorities in an autonomous driving environment, integrally manages various types of information data required by autonomous vehicles (e.g., safety information, traffic information) together with entertainment data for passengers, and selectively applies a pull-based or push-based forwarding method according to the characteristics and priorities of the respective data.

2. Description of the Related Art

As autonomous driving technology advances, autonomous vehicles are required to process and communicate vast amounts of diverse data in real time, including sensor data, V2X messages, high-precision map updates, multimedia streaming, and the like. Such data have different QoS requirements (e.g., low latency, high reliability, and broad bandwidth), and, in particular, critical information directly related to safety of autonomous driving should be processed with higher priority than other data.

Most of the existing forwarding schemes in VNDN environments have not considered separate queuing policies in depth for QoS differentiation, and often implicitly assume simple first-in-first-out (FIFO)-based packet scheduling. Such schemes can cause serious problems when autonomous vehicles are required to simultaneously receive and transmit various types of data, as urgent safety messages may be delayed or lost due to being crowded out by ordinary data or entertainment data. Since this can pose a direct threat to the safety and reliability of autonomous driving systems, the introduction of an intelligent queuing policy that can effectively manage transmission priorities by reflecting the characteristics and importance of each data type is urgently needed.

Moreover, autonomous vehicles are required to process and exchange vast amounts of data in real time to ensure safe and efficient operation. This includes critical safety information essential for the operation of the autonomous driving system (e.g., emergency alerts, sensor fusion data), general information that enhances driving convenience (e.g., real-time traffic conditions, guidance for surrounding facilities), and various entertainment content for passengers (e.g., video streaming, music). Such data each have different QoS requirements in terms of transmission method (push or pull), latency, reliability, and the like.

Existing VNDN environments primarily rely on a pull-based data request-response model, and only recently have some push-based schemes been introduced to enable rapid dissemination of critical information. However, in autonomous driving environments where information services and entertainment services coexist and where the importance and urgency of data vary even within each service, it is difficult to achieve optimal performance by using either a pull-based or push-based approach, or by operating them separately. For example, the processing of entertainment data requests may interfere with the dissemination of urgent safety information, or, conversely, transmitting all information using a push-based approach may increase network load. To satisfy both the safety of autonomous vehicles and the user experience, an integrated and intelligent adaptive forwarding mechanism, which can identify various data types and dynamically select and apply forwarding strategies according to the characteristics of each data type, is essential.

SUMMARY

The present invention has been devised to solve such problems, and in particular, aims to provide, in a complex and dynamic VNDN environment in which autonomous vehicles operate, a QoS provisioning method based on a novel queuing policy that can guarantee differentiated processing priorities according to the importance and QoS requirements of various infotainment services and safety-related information services.

Specifically, the present invention overcomes the limitations of conventional simple FIFO or static WFQ methods, differentiates the QoS among various traffic classes including critical information, non-critical information, and entertainment data, considering the real-time requirements and data diversity of autonomous driving environments, and determines the queuing weights reflecting the dynamic network states and characteristics of each packet, thereby proposing a fuzzy logic-based EWFQ queuing method that maximizes overall communication efficiency and stability of the autonomous driving system.

Another object of the present invention is to provide an integrated adaptive forwarding method that, in a complex and dynamic VNDN environment where autonomous vehicles operate, effectively distinguishes and simultaneously services information data (critical/non-critical) and entertainment data with different characteristics and QoS requirements, and can selectively provide pull-based or push-based forwarding optimized for each data type for the first time.

Specifically, the present invention is to provide a method that identifies the type of data (e.g., critical information for autonomous driving, general information, entertainment) through the class attribute of a data packet, and determines whether and how to forward the packet based on network parameters in which each intermediate node reflects the characteristics of the autonomous driving environment using the weight attribute (e.g., centrality, direction, speed, hop count, RSSI), thereby mitigating broadcast storms and maximizing overall data forwarding efficiency, QoS satisfaction, and communication reliability of the autonomous driving system.

To achieve such objects, a method for performing data forwarding using queues classified for comprehensive infotainment services by an autonomous vehicle or a road side unit (RSU) in a vehicular named data networking (VNDN) environment including autonomous vehicles according to the present invention, includes: (a) a step of generating or receiving a data packet by the autonomous vehicle or the road side unit (RSU); (b) a step of placing the data packet, according to a class attribute included in the data packet, into a separate queue classified based on the class attribute; (c) a step of computing a current node weight (CNW) for the data packet and including the computed weight value in a weight attribute of the data packet; (d) a step of determining a forwarding order of the data packet according to the computed current node weight; and (e) a step of forwarding the data packet according to the determined order.

The class attribute may be classified into critical, non-critical, and entertainment.

The critical attribute may include one or more of emergency alerts, traffic alerts, accident alerts, hazardous warnings, construction alerts, speed limit alerts, lane closure alerts, disaster warnings, security alerts, and health alerts.

The non-critical attribute may include one or more of navigation, weather updates, real-time traffic information, gas station information, traffic signal information, and speed limit information.

The entertainment attribute may include one or more of music, video, radio, podcasts, video calls, e-books, news, social media, live streaming, and virtual reality.

In the step (c), the current node weight (CNW) may be computed as:

$$W_{in} = \alpha_1 \times \left(\frac{RSSI_{in}}{RSSI_{max}}\right) + \alpha_2 \times \left(\frac{D_{in}}{D_{max}}\right) + \alpha_3 \times \left(\frac{V_{in}}{V_{max}}\right) +$$
$$\alpha_4 \times \left(\frac{HC_{in}}{HC_{max}}\right) + \{1 - (\alpha_1 + \alpha_2 + \alpha_3 + \alpha_4)\} \times \left(\frac{NC_{in}}{NC_{max}}\right),$$

wherein $RSSI_{in}$ denotes a received signal strength indication of vehicle n for packet i, $D_{in}$ denotes the direction of vehicle n for packet i, $V_{in}$ denotes the speed of vehicle n for packet i, $HC_{in}$ denotes a hop count of packet i through vehicle n, $\alpha_1$, $\alpha_2$, $\alpha_3$, and $\alpha_4$ are coefficients for adjusting the importance of each parameter, and $NC_{in}$ denotes a node centrality of vehicle n for information packet i when the class attribute is critical or non-critical, or a name centrality representing the number of interest packets received from vehicle n for entertainment data packet i when the class attribute is entertainment.

The data forwarding method may further include: (f1) a step of acquiring a received signal strength (RSS), GPS coordinates of the current node autonomous vehicle, and a speed value; (f2) a step of computing an estimated location of the current node autonomous vehicle by using an extended Kalman filter (EKF); (f3) a step of acquiring a received signal strength value from a new road side unit (RSU) when the estimated location is not within a range of the same RSU as before; and (f4) a step of forwarding (handover) vehicle information and a PIT/FIB table to the new RSU when the received signal strength value of the new RSU is greater than that of the previous RSU.

A method for performing adaptive data forwarding for comprehensive infotainment services by an autonomous vehicle or a RSU in a vehicular named data networking (VNDN) environment including autonomous vehicles according to the present invention, includes: (a) a step of generating or receiving a data packet by the autonomous vehicle or the road side unit (RSU); (b) a step of classifying the data packet according to a class attribute included in the data packet; (c) a step of computing a current node weight (CNW) for the data packet including the class attribute from parameters for weight computation, and including the computed weight value into a weight attribute of the data packet; (d) a step of determining a forwarding order of the data packet according to the computed current node weight; and (e) a step of forwarding the data packet according to the determined order, the parameters for weight computation of the step (c) include one or more pieces of information among priority, link quality, network density, and arrival time information, and the current node weight is computed by a fuzzy logic system using the parameters for weight computation as input variables.

The fuzzy logic system may convert the network state parameters into fuzzy sets through a fuzzifier, apply fuzzy rules predetermined in an inference engine to derive a fuzzy output value, and convert the fuzzy output value into the dynamic queuing weight through a defuzzifier.

According to another aspect of the present invention, a system installed in an autonomous vehicle or a road side unit (RSU) for providing data forwarding using queues classified for comprehensive infotainment services in a vehicular named data networking (VNDN) environment including autonomous vehicles, includes: at least one processor; and at least one memory storing computer-executable instructions, wherein the computer-executable instructions stored in the at least one memory cause the at least one processor to perform: (a) a step of generating or receiving a data packet; (b) a step of placing the data packet, according to a class attribute included in the data packet, into a separate queue classified based on the class attribute; (c) a step of computing a current node weight (CNW) for the data packet and including the computed weight value in a weight attribute of the data packet; (d) a step of determining a forwarding order of the data packet according to the computed current node weight; and (e) a step of forwarding the data packet according to the determined order.

According to another aspect of the present invention, a system installed in an autonomous vehicle or a road side unit (RSU) for performing adaptive data forwarding for comprehensive infotainment services in a vehicular named data networking (VNDN) environment including autonomous vehicles, includes: at least one processor; and at least one memory storing computer-executable instructions, wherein the computer-executable instructions stored in the at least one memory cause the at least one processor to perform: (a) a step of generating or receiving a data packet; (b) a step of classifying the data packet according to a class attribute included in the data packet; (c) a step of computing a current node weight (CNW) for the data packet including the class attribute from parameters for weight computation, and including the computed weight value into a weight attribute of the data packet; (d) a step of determining a forwarding order of the data packet according to the computed current node weight; and (e) a step of forwarding the data packet according to the determined order.

According to another aspect of the present invention, a computer program computer-readable non-transitory providing data forwarding using queues classified for comprehensive infotainment services in a vehicular named data networking (VNDN) environment including autonomous vehicles is provided, the computer program being stored on the non-transitory storage medium and including instructions, which cause a processor to execute: (a) a step of generating or receiving a data packet; (b) a step of placing the data packet, according to a class attribute included in the data packet, into a separate queue classified based on the class attribute; (c) a step of computing a current node weight (CNW) for the data packet and including the computed weight value in a weight attribute of the data packet; (d) a step of determining a forwarding order of the data packet according to the computed current node weight; and (e) a step of forwarding the data packet according to the determined order.

According to still another aspect of the present invention, a computer program stored on a computer-readable non-transitory storage medium for performing adaptive data forwarding for comprehensive infotainment services in a vehicular named data networking (VNDN) environment including autonomous vehicles is provided, the computer program being stored on the non-transitory storage medium and including instructions, which cause a processor to execute: (a) a step of generating or receiving a data packet; (b) a step of classifying the data packet according to a class attribute included in the data packet; (c) a step of computing a current node weight (CNW) for the data packet including the class attribute from parameters for weight computation, and including the computed weight value into a weight attribute of the data packet; (d) a step of determining a forwarding order of the data packet according to the computed current node weight; and (e) a step of forwarding the data packet according to the determined order.

BRIEF DESCRIPTION OF THE DRAWINGS

FIG. 2 is a diagram illustrating an enhanced weighted fair queuing (EWFQ) scheduling scheme for infotainment services in a VNDN environment.

FIG. 4 is a diagram illustrating an extended Kalman filter (EKF)-based mobility management process in the framework of the present invention.

FIG. 9A to FIG. 9D are diagrams illustrating performance comparisons between EPDF and a conventional fragment-based scheme at vehicle speed ranges of 70 to100 km/h.

FIG. 10A and FIG. 10B are diagrams illustrating data forwarding performance comparisons between APDF of the present invention and conventional schemes at an average speed of 80 km/h.

FIG. 11A and FIG. 11B are diagrams illustrating performance comparisons between EKF and conventional schemes at an average speed of 80 km/h.

DETAILED DESCRIPTION

Figure 1:
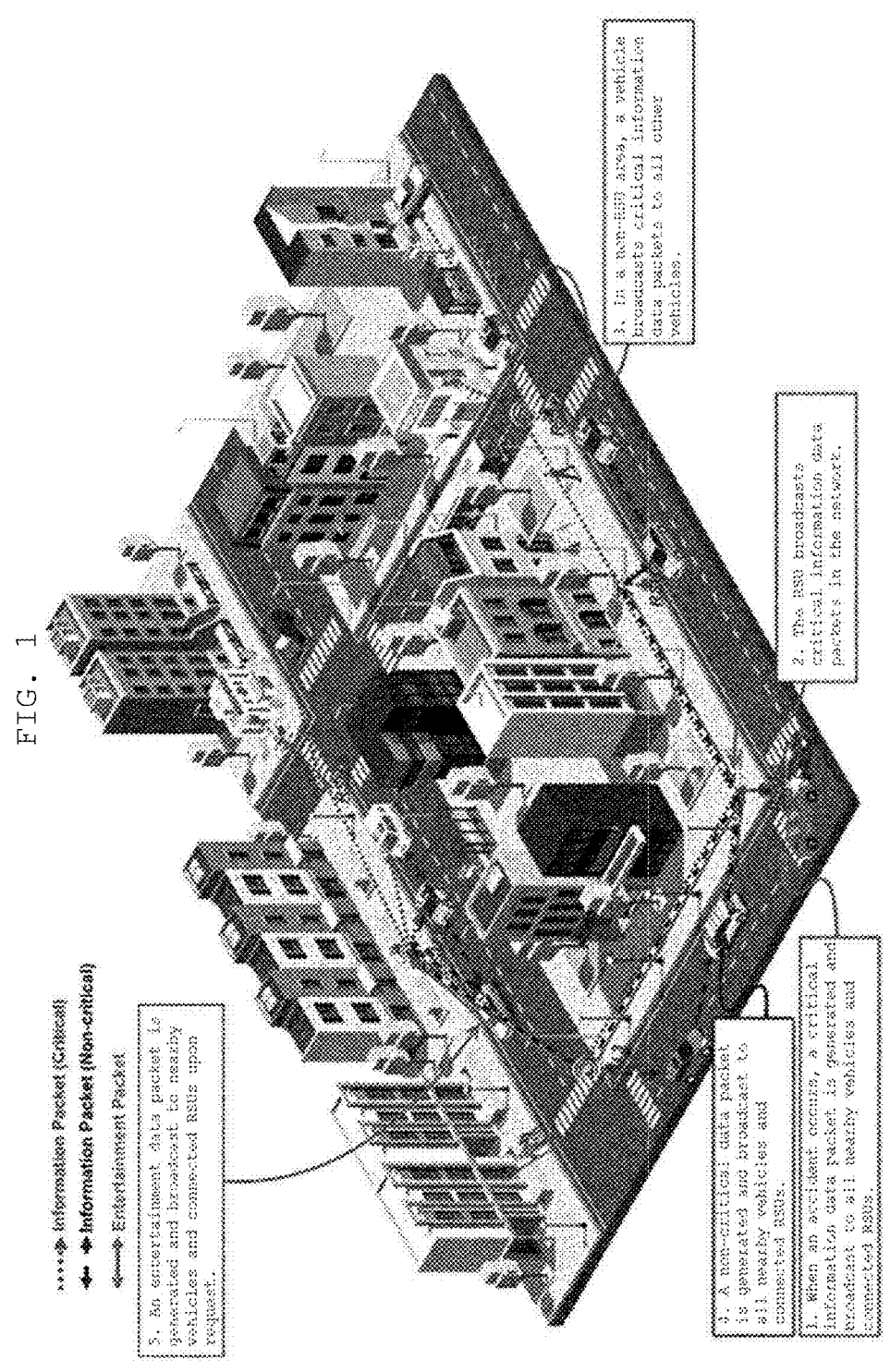
FIG. 1 is a diagram illustrating an embodiment of a vehicular named data networking (VNDN) environment for infotainment in a smart city.

The preferred embodiments of the present invention will now be described in detail with reference to the accompanying drawings. Prior to that, the terms and words used in this specification and the claims should not be construed as being limited to their ordinary or dictionary meanings. Rather, they should be interpreted in accordance with the technical spirit of the present invention based on the principle that the inventor may appropriately define the concepts of terms to describe the invention in the best possible manner. Therefore, the embodiments described in this specification and the configurations shown in the drawings merely illustrate the most preferred embodiments of the present invention and do not encompass the entire technical scope of the invention. It should be understood that, as of the filing date of this application, various equivalents and modifications that can replace these embodiments may exist.

Figure 2:
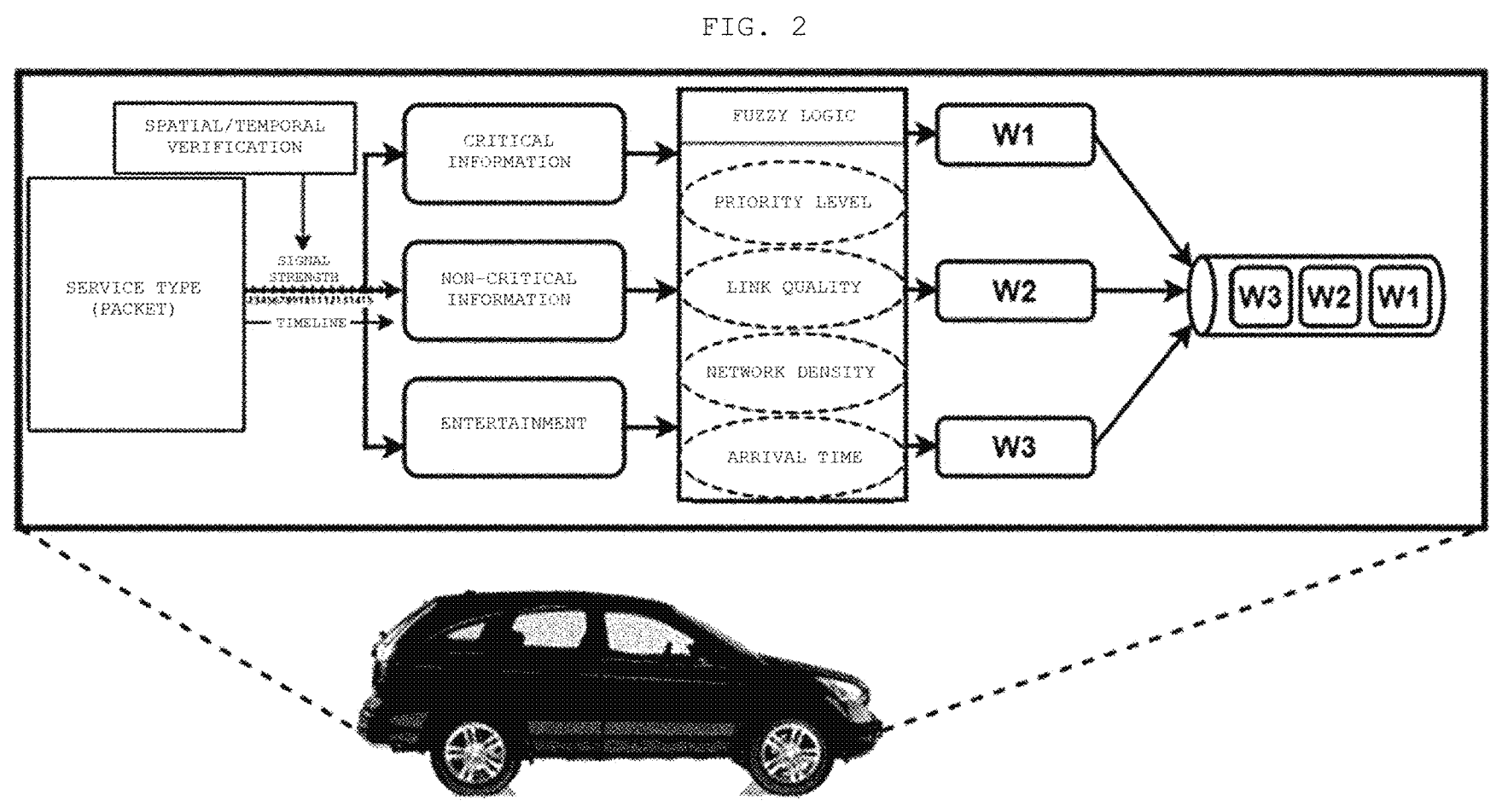
Figure 3:
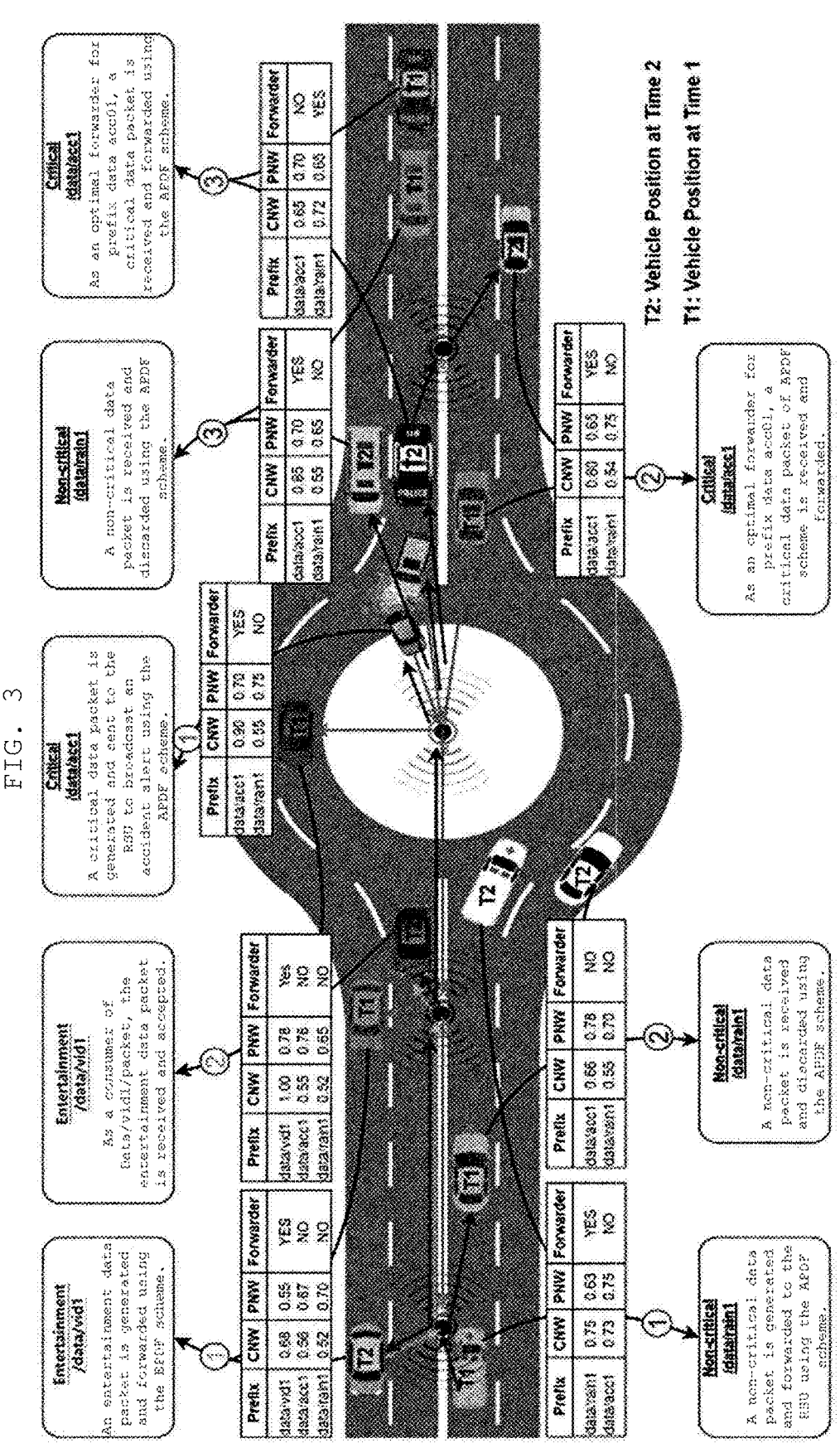
FIG. 3 is a diagram illustrating an embodiment of the basic processes of advanced push-based data forwarding (APDF) and enhanced pull-based data forwarding (EPDF) in the adaptive forwarding policy of the present invention.

FIG. 1 is a diagram illustrating an embodiment of a vehicular named data networking (VNDN) environment for infotainment in a smart city, FIG. 2 is a diagram illustrating an enhanced weighted fair queuing (EWFQ) scheduling scheme for infotainment services in the VNDN environment, FIG. 3 is a diagram illustrating an embodiment of the basic processes of advanced push-based data forwarding (APDF) and enhanced pull-based data forwarding (EPDF) in the adaptive forwarding policy of the present invention, and FIG. 4 is a diagram illustrating an extended Kalman filter (EKF)-based mobility management process in the framework of the present invention.

Hereinafter, with reference to FIG. 1 to FIG. 4, the framework of the present invention for providing overall infotainment services in a VNDN environment will be described. The present invention particularly proposes a comprehensive framework including data packet formats essential for supporting various infotainment services, service type classification, enhanced queuing policies, adaptive forwarding strategies, and efficient mobility management methods in a VNDN environment including autonomous vehicles. Specifically, the core components of the framework include an adaptive forwarding strategy applying push-based and pull-based forwarding schemes optimized for information data and entertainment data, respectively, and an EKF-based mobility management strategy that provides improved handover latency compared to conventional vehicle tracking-based mobility management methods.

1) VNDN Environment

The VNDN environment includes consumers, producers, intermediate vehicles, and road side units (RSUs). The components thereof are described in Table 1.

TABLE 1

| Entity | Description |
|---|---|
| Consumer | A consumer means, in the VNDN environment, a vehicle that requests data content and generates interest packets to receive the corresponding data. |
| Producer | A producer is an entity that generates information and entertainment data and distributes them within the network. The producer forwards the generated data packets to consumer vehicles via intermediate vehicles and RSUs. |
| Intermediate Vehicles | Intermediate vehicles act as forwarders, facilitating multi-hop data exchange between a consumer and a producer. The intermediate vehicles receive interest packets from a nearby consumer and forward them to a potential data producer according to the forwarding strategy, and subsequently forward them to the consumer requesting data packets. |
| Road Side Unit (RSU) | RSUs are connected to the core network backbone and provide direct connectivity to vehicles within their coverage area. The RSUs function to forward data packets from a producer to a consumer or forward interest packets from a consumer to a producer. |

FIG. 1 is a diagram illustrating an example of a VNDN environment in an urban smart city. This smart city includes a variety of vehicles, including buses, police cars, ambulances, taxis, and private vehicles, and is integrated with major infrastructure such as bidirectional roads, highways, hospitals, police stations, schools, offices, and residential buildings. Vehicles, including autonomous vehicles, are interconnected within the VNDN environment via V2X (vehicle-to-everything) communication.

2) Data Packet Format

A data packet format used in the proposed framework plays a crucial role in effectively supporting various infotainment services in a VNDN environment for autonomous vehicles. Each data packet contains essential information that guides its processing, forwarding decisions, and quality of service (QoS) provisioning. The following Table 2 shows the attributes included in the data packet format and significance thereof.

TABLE 2

| Attribute | Description |
|---|---|
| Content Name | A unique identifier of the content forwarded by the data packet. This enables content search and routing in VNDN. |
| Size | A size of the data packet in bytes. This represents the amount of data being transmitted. |
| Class | A classification of data packets based on content type (e.g., critical information, non-critical information, entertainment). This guides priority assignment and quality of service (QoS) provisioning. |
| Weight | A weight value computed based on parameters such as centrality and direction from the previous node. This influences forwarding decisions to select the optimal forwarder and to more efficiently mitigate the data broadcast storm. |

In VNDN, the content name is an important attribute that uniquely identifies the content forwarded by the data packet. The size attribute specifies the size of a data packet in bytes, provides information about the amount of data being transmitted, and contributes to the efficient allocation of network resources. The class attribute classifies data packets according to content type such as critical information, non-critical information, or entertainment data required for autonomous driving, thereby guiding QoS provisioning and priority assignment to ensure that critical data is processed first. The weight attribute is computed by the previous node and may be used by the next node to determine whether to forward the packet. This weight influences the forwarding decision for selecting the optimal forwarder in accordance with the proposed adaptive forwarding strategy. The combination of these attributes facilitates adaptive forwarding, priority assignment, and QoS provisioning within the VNDN environment, thereby improving the efficiency and effectiveness of infotainment services for autonomous vehicles.

3) Beacon Format

In the proposed EKF-based mobility management scheme, all RSUs and vehicles, including autonomous vehicles, periodically exchange beacons using wireless access in vehicular environments (WAVE) communication channel. These beacons include attributes such as RSUc (currently connected RSU), received strength signal (RSS), location (GPS coordinates), speed, pending interest table (PIT)/forwarding information base (FIB) entries, and a time-stamp. Through beacon exchanges, nodes can monitor network conditions and adjust their operations accordingly. The beacon format is as shown in Table 3.

TABLE 3

| Attribute | Description |
|---|---|
| RSUC | RSU currently connected to the moving vehicle |
| RSS | Received signal strength measured by the moving vehicle from the RSUc |
| Location | GPS coordinates of the moving vehicle |
| Speed | Instantaneous speed of the moving vehicle |
| PIT/FIB | PIT/FIB entries associated with the moving vehicle from previous RSUs |
| Timestamp | Time at which the beacon is generated |

RSS, GPS coordinates, and speed information can be used for vehicle tracking in the proposed EKF-based scheme. The RSUc attribute indicates the RSU to which the vehicle is currently connected. The PIT/FIB attribute indicates that PIT/FIB entries from previous RSUs associated with the moving vehicle need to be shared with relevant RSUs.

4) Classification of Infotainment Services

The proposed framework classifies infotainment services required for autonomous vehicle operation in a VNDN environment into three classes based on their characteristics: critical information, non-critical information, and entertainment. This classification is essential for enabling customized data dissemination that meets specific QoS requirements. The following Table 4 shows examples of data types belonging to each service class.

TABLE 4

| Critical | non-critical | Entertainment |
|---|---|---|
| Emergency Alerts | Navigation | Music |
| Traffic Alerts | Weather Update | Video |
| Road Alerts | Real-Time | Radio |
| Accidents Alerts | Traffic | Podcast |
| Hazardous Warnings | Information | Video call |
| Construction Alerts | Gas Station | E-book |

TABLE 4-continued

| Critical | non-critical | Entertainment |
|---|---|---|
| Speed Limit Alerts | Information | News |
| Lane Closure Alerts | Traffic Signal | Social Media |
| Disaster Warnings | Information | Live Streaming |
| Security Alerts | Speed Limit | Virtual Reality |
| Health Alerts | Information | |

Critical Information: This is essential for public safety, requiring highly reliable real-time dissemination, particularly to ensure the safe operation of autonomous vehicles. This includes emergency alerts, traffic warnings, and similar information that can contribute to life protection and must be forwarded with the lowest possible latency. The highest priority is assigned in terms of forwarding and resource allocation to guarantee timely forwarding.

Non-Critical Information: This helps drivers optimize road navigation efficiency. This includes navigation guidance, real-time traffic updates, and the like, is classified with medium priority, and requires standard forwarding service.

Entertainment Data: This includes media-rich, bandwidth-intensive applications such as video streaming and social media and is designed to enhance in-vehicle experience. The lowest priority is assigned to ensure that critical and non-critical information receive stable forwarding first.

5) Adaptive Forwarding

In vehicular communications within a VNDN environment, data is forwarded and distributed based on content names, differentiating it from conventional IP address-based, location-dependent methods. In the proposed framework, data packets undergo multiple stages to be efficiently and timely forwarded to the intended recipients, such as autonomous vehicles or related infrastructure.

Traffic Classification and Class Queues: The framework classifies various data packets into three class queues (critical information queue, non-critical information queue, entertainment data queue).

Enhanced Weight Fair Queuing (EWFQ): The proposed framework introduces an EWFQ policy to handle packet scheduling in the VNDN environment (see FIG. 2). EWFQ allows dynamic scheduling and assigns variable weights according to multiple parameters. For example, upon receiving a data packet, temporal requirements are verified in consideration of the arrival time, giving priority in processing and forwarding to packets that arrived earlier. For spatial validation, signal strength is used to determine the geographic location and spatial proximity of neighboring autonomous vehicles/RSUs, with higher signal strength indicating closer proximity. Packets that pass the temporal/spatial validation obtain queuing weights through the fuzzy logic system. Packets with higher weights are processed and transmitted first (see FIG. 2), and the forwarding order is adjusted according to the computed weights. That is, packets with the highest weight W1 are forwarded first, followed by W2 and W3. The fuzzy logic system computes appropriate weights considering various parameters, such as priority, link quality, network density, and arrival time. Link quality accurately measures signal strength, available bandwidth, and reliability to control data flow and reduce packet loss, while network density assesses network load from the data flow. The fuzzy logic includes a fuzzifier (converting input variables into fuzzy sets), an inference engine (applying fuzzy rules), and a defuzzifier (converting fuzzy sets into outputs). Compared with conventional WFQ and FIFO policies, EWFQ is an efficient scheduler that assigns more dynamic and precise weights to service flows by leveraging the fuzzy logic system.

Advanced Push-based Data Forwarding (APDF): In VNDN, push-based data forwarding refers to distributing critical and non-critical information to all vehicles, including autonomous vehicles, within the network, enabling information transmission without explicit requests and thus eliminating the need for PIT entries. The proposed framework introduces APDF for distributing critical and non-critical information to mitigate the broadcast storm effect of essential information in autonomous driving scenarios within the VNDN environment. The APDF approach selects forwarders using the current node's weight (CNW) and the previous node's weight (PNW), providing more optimal forwarding and enabling stronger and more efficient information dissemination to all vehicles, including autonomous vehicles, in the VNDN environment. The CNW field represents the weight of the current node, while the PNW field represents the weight of the previous node that facilitated packet forwarding. Each node maintains a CNW and PNW attribute table to be selected as an optimal forwarder. The weight Win for information i at vehicle n is computed using the following Equation (1).

$$W_{in} = \alpha_1 \times \left( \frac{RSSI_{in}}{RSSI_{max}} \right) + \alpha_2 \times \left( \frac{D_{in}}{D_{max}} \right) + \alpha_3 \times \left( \frac{V_{in}}{V_{max}} \right) + \qquad (1)$$
$$\alpha_4 \times \left( \frac{HC_{in}}{HC_{max}} \right) + \{1 - (\alpha_1 + \alpha_2 + \alpha_3 + \alpha_4)\} \times \left( \frac{NC_{in}}{NC_{max}} \right)$$

Here, $RSSI_{in}$ denotes a received signal strength indication of vehicle n for packet i, $D_{in}$ denotes the direction of vehicle n for packet i, $V_{in}$ denotes the speed of vehicle n for packet i. $HC_{in}$ denotes a hop count of packet i through vehicle n, and $NC_{in}$ denotes a node centrality of vehicle n for information packet i. All parameters are normalized by dividing them by their maximum values, and the $\alpha$ coefficients reflect the importance of each term to determine the optimal forwarder.

When critical or non-critical information packets are generated by producer vehicles, such as autonomous vehicles or RSUs that create the information, the process begins with the initialization of the TTL (Time-To-Live) parameter in order to limit the data dissemination range. The producer vehicle broadcasts the data packet along with an initial weight that is computed based on parameters such as RSSI, speed, and direction. Each receiving autonomous vehicle checks whether it is within the RSU coverage; and if so, the RSU acts as the default forwarder. Otherwise, the vehicle computes the CNW using the same parameters and compares it with the PNW. Data is forwarded only when the CNW of the critical or non-critical information is greater than the PNW; otherwise, the packet is discarded. This selective forwarding continues with each forwarder decrementing the TTL, and until the TTL expires, the data reaches all vehicles, including autonomous vehicles, through more robust and efficient paths, thereby effectively mitigating the broadcast storm effect. The basic process of APDF is illustrated in FIG. 3. Critical and non-critical information data are generated and transmitted only by the optimal forwarders within the network using the APDF scheme. By selectively forwarding through nodes with higher weights, APDF achieves more efficient push-based data dissemination to all autonomous vehicles.

Enhanced Pull-based Data Forwarding (EPDF): The proposed framework also introduces enhanced pull-based data forwarding (EPDF) for the distribution of entertainment data, which is an improved version of the NameCent method. The EPDF approach enables the selection of more optimal forwarders to facilitate better data forwarding. While NameCent uses two parameters of the number of received interest packets and RSSI values, the EPDF scheme introduces three additional parameters of speed, direction, and hop count in order to select more robust optimal forwarders. The weight value $W_i$ for vehicle n with respect to entertainment data packet i can be computed using Equation (1), which is the same as described for APDF. However, in the case of EPDF, the $NC_{in}$ term in Equation (1) denotes a name centrality, which represents the number of interest packets received from vehicle n for entertainment data packet i. The basic process of the proposed EPDF is illustrated in FIG. 3. When the CNW of the entertainment content is higher than the PNW, the EPDF selects the current node as the optimal forwarder. Accordingly, in the figure, vehicle nodes for data/vid01 are retained as the optimal forwarders. In EPDF, the TTL value is used to represent the maximum number of hops a data packet can traverse before being discarded.

[]6) Mobility Management Support

Mobility management is an essential component in VNDN environments, particularly to ensure seamless handovers and reliable QoS in response to the dynamic movements of autonomous vehicles. The proposed framework uses the extended Kalman filter (EKF) to provide a robust solution for smoother mobility coordination of autonomous vehicles. The EKF-based mobility management strategy can be applied to both consumer and producer autonomous vehicles, using signal strength, speed, direction, and GPS inputs to estimate real-time locations and manage handovers according to vehicle movement (see FIG. 4).

Compared with existing studies, the proposed EKF is a real-time location estimation technique that dynamically predicts more accurate locations of autonomous vehicles by utilizing the Kalman model. By providing precise real-time location information, the EKF enables more reliable data retrieval during autonomous vehicle mobility in VNDN environments. The proposed EKF technique recursively processes the measurements collected during movement to accurately track the locations of consumer/producer autonomous vehicles and predict the next target RSU. This provides better and smoother mobility support while minimizing overhead. In contrast to the TNS algorithm, which relies on geographic directions and is constrained by the length of the Tabu list, the EKF technique provides more precise location estimates to track the movements of autonomous vehicles and more accurately predict future RSU connections. This enables proactive handovers to minimize service interruptions during the movement of consumer/producer autonomous vehicles.

Location Estimation Using EKF: According to FIG. 4, the process starts by initializing the EKF algorithm with the current location of the autonomous vehicle. When new values such as GPS coordinates, speed, direction, and signal strength are received, they are compared with the predicted values. Based on this comparison, the Kalman gain is computed, which determines the adjustment required for the prediction according to the new measurements. The Kalman gain is a key parameter in the EKF algorithm that defines how much the filter trusts the predicted value versus the measurements. The adjusted prediction is combined with the newly received measurements to obtain an updated estimate of the autonomous vehicle's location. This updated estimate becomes the new starting point for the next prediction. By repeating these steps iteratively, the system can accurately track the location of the autonomous vehicle over time.

The EKF algorithm comprises three main steps of prediction, measurement update, and state estimate in order to accurately estimate the location of the autonomous vehicle and predict the next target RSU.

a) Step 1 (Prediction): In this step, the predicted state estimate from the previous time step and the predicted state covariance matrix are propagated to the current time step using the system dynamic model.

$$\hat{x}_{k|k-1} = f\left(\hat{x}_{k-1|k-1}, u_{k-1}\right) \tag{2}$$

$$P_{k|k-1} = F_{k-1}P_{k-1|k-1}F_{k-1}^T + Q_{k-1} \tag{3}$$

Here, the predicted state estimate $\hat{}_{k|k-1}$ is obtained by applying the nonlinear state transition function f(.) to the previous state estimate $\hat{}_{k|k-1}$ and the control input $u_{k-1}$. The predicted state covariance matrix is computed using the Jacobian matrix F $F_{k-1}$, which represents the partial derivates of f(.) with respect to the state variables, the previous state covariance matrix $P_{k-1|k-1}$, and the process noise covariance matrix $Q_{k-1}$.

b) Step 2 (Measurement Update): In this step, the predicted state estimate and the predicted state covariance matrix are updated using the current measurement $y_k$.

$$K_k = P_{k|k-1}H_k^T\left(H_kP_{k|k-1}H_k^T + R_k\right)^{-1} \tag{4}$$

$$\hat{x}_{k|k} = \hat{x}_{k|k-1} + K_k\left(y_k - h(\hat{x}_{k|k-1})\right) \tag{5}$$

$$P_{k|k} = (I - K_kH_k)P_{k|k-1} \tag{6}$$

Here, the Kalman gain $K_k$ is computed using the predicted state covariance matrix $P_{k|k-1}$, the Jacobian matrix $H_k$ representing the partial derivatives of the measurement function h(.) with respect to the state variables, the measurement noise covariance matrix $R_k$, and the measurement update equation. The updated state estimate $\hat{}_{k|k}$ is obtained by combining the predicted state estimate and the Kalman gain with the difference between the measurement $y_k$ and the value of the measurement function evaluated at the predicted state estimate. The updated state covariance matrix $P_{k|k}$ is obtained by adjusting the predicted state covariance matrix using the Kalman gain and Jacobian matrix.

C) Step 3 (State Estimate): At time step k, the state estimate is obtained as the updated state estimate $\hat{}_{k|k}$ following the measurement update step.

$$\hat{X}_k = \hat{X}_{k|k} \tag{7}$$

The EKF algorithm iteratively repeats the three afore-mentioned steps to estimate the location of the autonomous vehicle and predict the next RSU based on the measurements. This algorithm incorporates the nonlinearity of the system through the state transition and measurement functions and accounts for uncertainties in the measurements and system dynamics using the process noise and measurement noise covariance matrices. It should be noted that specific implementation details, such as the selection of the state vector, derivation of the state transition and measurement functions, and tuning of the noise covariance matrices, may vary depending on the particular requirements and characteristics of the considered VNDN environment.

Handover Management: The EKF algorithm is used to estimate the location of the autonomous vehicle and to facilitate the handover management process in the VNDN environment. The decision to initiate a handover is made based on predefined criteria, such as a SINR (Signal-to-Interference-plus-Noise Ratio) threshold. When these criteria indicate that a handover is required to maintain a seamless connection with a new RSU, the process is proactively initiated based on the location estimation provided by the EKF.

The EKF-based mobility management strategy ensures reliable data forwarding when the autonomous vehicle moves. For example, when an RSU receives an interest packet from a consumer (autonomous vehicle), the EKF model is used to track the location of the consumer. As the consumer (autonomous vehicle) moves, the EKF continuously updates the estimated location. This tracking process is also applied when a producer (autonomous vehicle or information source) changes its location. In the reverse path of data forwarding, when the consumer (autonomous vehicle) is still within the initial RSU coverage, the data packet is forwarded directly. However, when the consumer (autonomous vehicle) has moved out of range, the PIT entries associated with the consumer (autonomous vehicle) are shared with the next anticipated RSU based on the predicted vehicle location. This ensures that even when the consumer (autonomous vehicle) moves to a new RSU, the data packets are correctly forwarded using the EKF-provided location inputs. Similarly, when a producer (autonomous vehicle or information source) moves to a new RSU, the RSU updates the FIB entries associated with said producer (autonomous vehicle or information source).

PIT entries are shared with the next target RSU through beacons. Each RSU generates a Bloom filter that summarizes the PIT entries. This Bloom filter is embedded in the beacon indicated by the PIT and broadcast to neighboring RSUs. The target RSU receives the beacon and extracts the Bloom filter to update the PIT entries related to the corresponding consumer. The update process includes comparing the new PIT entries with the local PIT entries of the target RSU using conventional data structures, such as hash tables. By using the Bloom filter as a probabilistic data structure, potential matching entries can be efficiently identified and updated in the local PIT. This approach facilitates efficient data forwarding based on the predicted locations of consumers and producers (autonomous vehicles or related nodes) while preserving the NDN principles.

Figure 5:
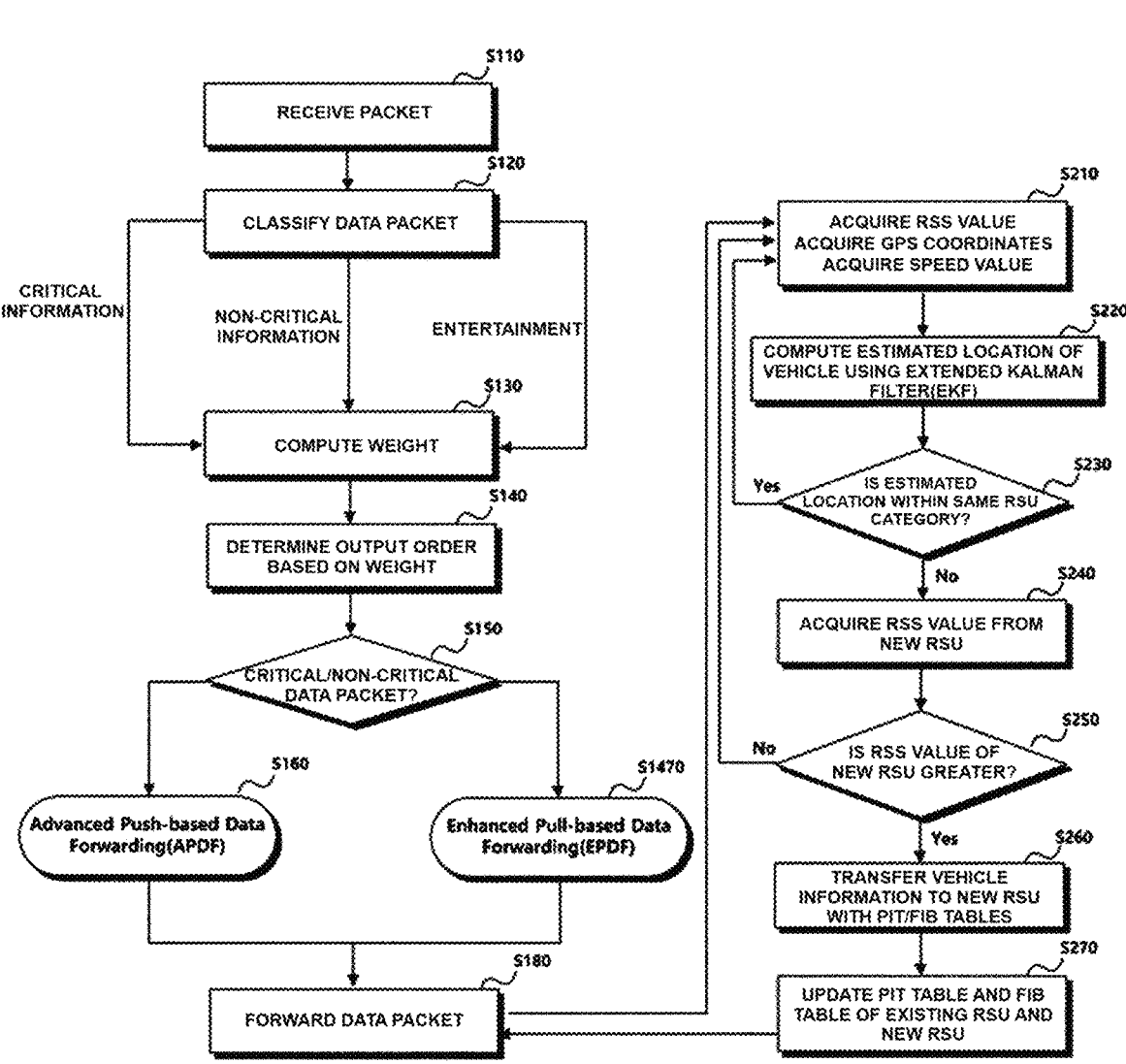
FIG. 5 is a flowchart for providing comprehensive infotainment services in VNDN according to the present invention.

FIG. 5 is a flowchart for providing comprehensive infotainment services in VNDN according to the present invention.

FIG. 5 illustrates the workflow of the proposed framework, which centers on adaptive forwarding and mobility management in a VNDN environment. The workflow includes two main segments: (a) adaptive forwarding and (b) mobility management support.

The proposed framework uses an adaptive forwarding strategy that considers the priority and type of each data packet in the autonomous driving environment. When a new packet arrives (S110), it is classified as critical information, non-critical information, or entertainment data, and placed into the corresponding critical information queue, non-critical information queue, or entertainment data packet queue (S120). Subsequently, the EWFQ scheduler assigns an appropriate weight to each packet (S130), and the forwarding order is determined based on the weights. Critical information is given the highest priority. Each data packet waits in the queue according to the weight assigned by the EWFQ scheduler.

For critical and non-critical information related to the safety of autonomous driving, the APDF method is invoked to determine the optimal forwarder based on direction, speed, node centrality, and other factors (S150, S160). For entertainment content, data forwarding and content retrieval are handled using the EPDF method (S150, S170). Thereafter, the data packets determined to be forwarded are forwarded (S180).

The proposed framework also addresses the management of vehicle mobility in autonomous driving environments. As the consumer autonomous vehicle acquires RSS values, GPS coordinates, and speed information (S210) and moves away from the current RSU toward a new RSU, the extended Kalman filter (EKF)-based location estimation technique is invoked (S220). This technique utilizes the previous location of the consumer autonomous vehicle to estimate its current location and expected proximity to the new RSU (S230, S240, S250). This information triggers a request for a handover to the new RSU (S260). During the handover process, the newly anticipated RSU updates the PIT entries associated with the consumer autonomous vehicle (S270). This update is facilitated through a Bloom filter procedure that summarizes the PIT entries. The Bloom filter embedded in the beacon is used by the new RSU to properly update the PIT entries. Similarly, when a producer (autonomous vehicle or information source) moves to a new RSU, the EKF estimates its location. Based on this estimated location, the new RSU updates the FIB entries associated with the producer (autonomous vehicle or information source) (S270).

The proposed framework makes the final decisions on data forwarding using adaptive forwarding and EKF-based mobility management. These parallel procedures allow the selection of more optimal forwarders according to the forwarding mechanism to reflect the mobility of autonomous vehicles, thereby more effectively ensuring the mitigation of redundant infotainment data in the VNDN environment.

Hereinafter, the computational complexity and network overhead of the aforementioned framework according to the present invention are analyzed in a dense autonomous vehicle environment.

1) Computational Complexity Analysis

A comprehensive computational complexity analysis is provided for each algorithm used in the framework, namely EWFQ, adaptive forwarding (APDF/EPDF), and EKF.

The computational complexity of the proposed EWFQ mechanism includes two main steps: dynamic weight computation using fuzzy logic and a scheduling process. The dynamic computation of weights depends on the number of input variables and fuzzy rules. Let m denote the number of input variables and r the number of fuzzy rules; then, the computational complexity for evaluating the fuzzy rules is O(mr). The computational complexity of the scheduling process is O(log f), where f is the number of flows. Since m and r are constant values, the overall computational complexity of EWFQ can be simplified to O(log f) per packet, which grows logarithmically with the number of flows f.

The computational complexity of the proposed adaptive forwarding strategy is analyzed for both APDF and EPDF schemes. The APDF scheme handles push-based data forwarding, while the EPDF scheme is used during pull-based data forwarding; however, both schemes exhibit similar computational complexity characteristics. Several parameters such as RSS, speed, direction, hop count, and node centrality/name centrality are considered to compute the weight for each packet at the node or autonomous vehicle. The complexity of computing the weight value is O(v) based on the number of autonomous vehicles (v). For optimal decision-making, the adaptive forwarding strategy also considers the weight of the previous node for each packet. Therefore, the computational complexity of the adaptive forwarding strategy is O(vp), where p is the number of packets. Consequently, the overall adaptive forwarding complexity for both APDF and EPDF schemes is O(v+vp), which increases linearly with the number of vehicles v and packets p.

To analyze the computational complexity of the proposed EKF algorithm, the three steps of prediction, measurement update, and state estimate are considered.

The prediction step of EKF includes computing the predicted state estimate and the predicted state covariance matrix. When n denotes the dimension of the state vector, assuming the state transition function has constant complexity, the computational complexity for computing the predicted state estimate is O(n). The computational complexity of computing the predicted state covariance matrix is $O(n^2)$ due to the matrix multiplication operations. Therefore, the overall computational complexity of the prediction step is $O(n^2)$.

The measurement update step of the EKF computes three values: the Kalman gain, the updated state estimate, and the updated state covariance matrix. The computation of the Kalman gain includes matrix inversion and multiplication, which has a complexity of $O(n^3)$ when the dimension of the state vector is n. The complexities of computing the updated state estimate and the updated state covariance matrix are O(n) and $O(n^2)$, respectively. Thus, the computational complexity of the measurement update step is dominated by the Kalman gain computation, yielding $O(n^3)$.

The state estimation step includes simple assignment operations and has a time complexity of O(1). Consequently, the overall computational complexity of the EKF algorithm can be simplified to $O(n^3)$ at each iteration, where n is the dimension of the state vector.

Overall, the computational complexity of the framework can be expressed as $O(\log f+v+vp+n^3)$, with the dominant term being $O(n^3)$.

2) Network Overhead Analysis

In VNDN, network overhead refers to the additional data transmitted within the network beyond the actual desired data. This overhead includes redundant data packets and beacon packets, which are essential for the operation of the VNDN framework but consume network resources. Mathematically, the network overhead (NO) can be expressed as follows:

$$NO \approx \mathcal{D}_a + \mathcal{D}_r + \mathcal{D}_b \qquad (8)$$

Here, $D_a$ denotes the number of actual data packets, $D_r$ denotes the number of redundant data packets, and $D_b$ denotes the number of beacon packets. While actual data packets forward the desired information content, redundant data packets are replicas of actual data packets. Beacon packets are small control packets that convey essential information for network management and coordination, such as RSS, GPS coordinates, vehicle speed, and PIT/FIB entries.

When the size of an actual data packet is denoted as $S_a$ and the size of a beacon packet as $S_b$, the network overhead can be expressed as follows:

$$NO \approx (\mathcal{D}_a + \mathcal{D}_r) \times S_a + \mathcal{D}_b \times S_b \qquad (9)$$

Packet size plays an important role in determining both communication overhead and network overhead. Larger packet sizes require more network resources for transmission and processing, thereby increasing the overhead. The framework aims to minimize network overhead by reducing the amount of redundant data transmitted within the network. The adaptive forwarding methods (APDF and EPDF) reduce the overall network overhead by selecting an optimal forwarder and minimizing the distribution of redundant data packets ($D_r$). Considering the minimized number of redundant data packets, the network overhead of the proposed framework can be expressed as follows:

$$NO \approx (\mathcal{D}_a + \mathcal{D}'_r) \times S_a + \mathcal{D}_b \times S_b \qquad (10)$$

Here, $D'_r$ denotes the reduced number of redundant data packets, and $D'_r \ll D_r$.

In general, since the beacon packets carry only critical information, their size is much smaller than that of actual data packets ($S_a \ggg S_b$) and can be neglected. Accordingly, the overall network overhead of the proposed framework can be approximated as follows.

$$NO \approx (\mathcal{D}_a + (\mathcal{D}'_r)) \times S_a \qquad (11)$$

By minimizing the number of redundant data packets that are forwarded, the framework effectively reduces network overhead.

3) Comparison with Existing Representative Methods

When comparing the proposed framework with existing representative approaches used in VNDN, the computational complexity of the proposed framework, $O(n^3)$, is higher than the $O(n^2)$ complexity of the conventional methods. However, it should be noted that the increased computational complexity represents a trade-off for the enhanced capabilities and performance provided by the framework. By integrating advanced techniques such as EWFQ, APDF/EPDF, and EKF with queuing, data forwarding, and mobility management, the framework enables more efficient and reliable data distribution in autonomous VNDN environments.

Meanwhile, the proposed framework reduces network overhead to $$NO \approx (\mathcal{D}_a + \mathcal{D}'_r) \times S_a$$

showing a significant decrease compared to the conventional network overhead $$NO \approx (\mathcal{D}_a + \mathcal{D}_r) \times S_a.$$

Figure 9A:
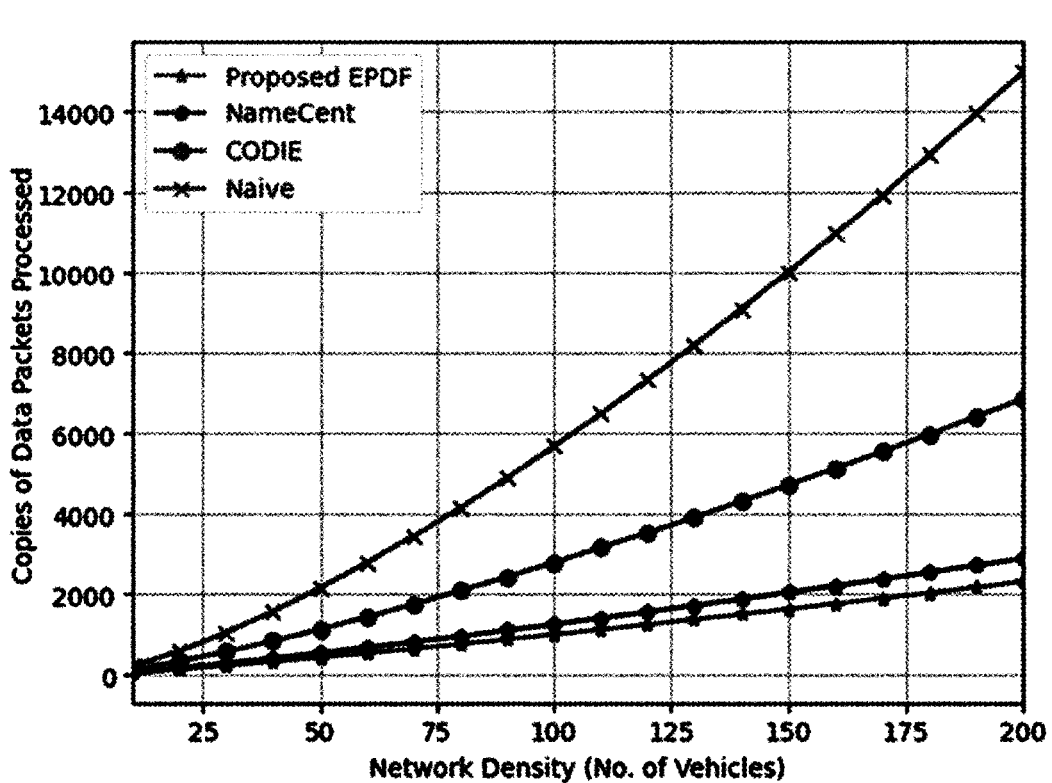
Figure 10A:
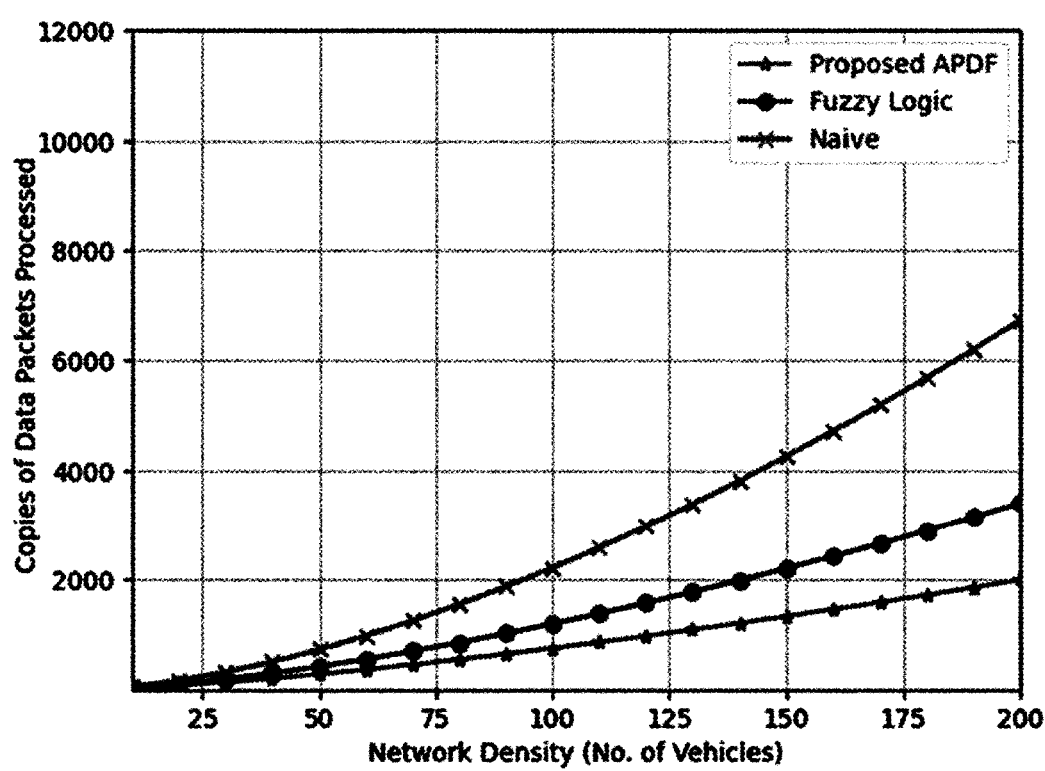

By selecting optimal forwarders using input parameters such as signal strength, autonomous vehicle speed, direction, hop count, and node/name centrality, the framework ultimately minimizes the distribution of redundant data packets within the network, thereby substantially reducing communication and network overhead. FIG. 9A and FIG. 10A illustrate the reduction of redundant data packet copies using the EPDF and APDF schemes, respectively. Minimizing redundant data packets leads to a notable decrease in network overhead, which is exemplified in FIG. 11A as supporting autonomous vehicle mobility while mitigating unnecessary data transmissions through the EKF-based mobility management approach. The reduction in network overhead achieved by the proposed framework provides enhanced performance and scalability in autonomous VNDN environments, although accompanied by increased computational complexity.

Figure 6:
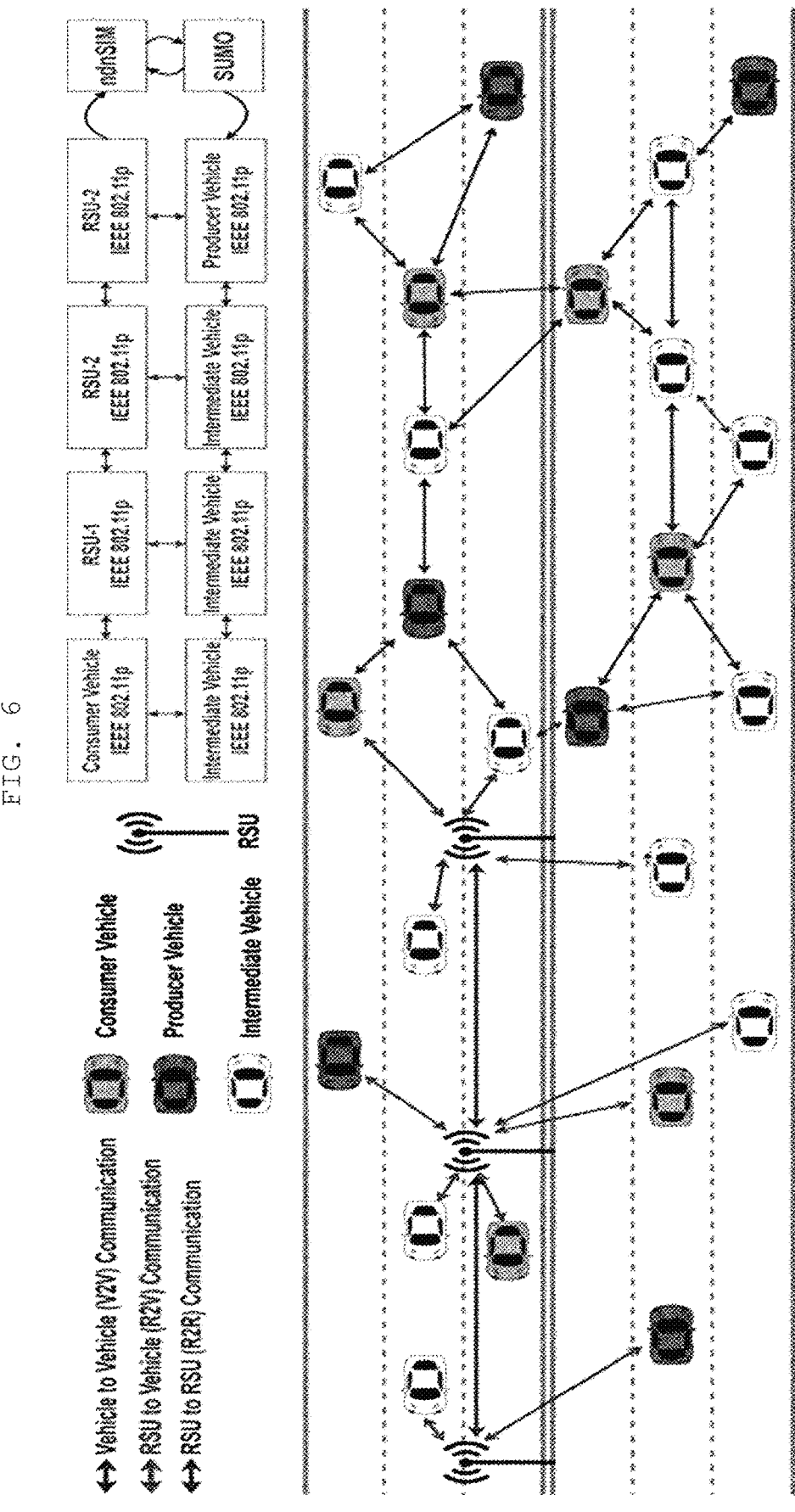
FIG. 6 is a diagram showing a scenario, as an embodiment, used to simulate the framework of the present invention in a dense VNDN environment.

FIG. 6 is a diagram showing a scenario, as an embodiment, used to simulate the framework of the present invention in a dense VNDN environment.

The simulations were conducted using the ndnSIM simulator. This simulator implements NDN protocols and networks on real-world topologies. The simulations were performed to evaluate the performance of the proposed framework in a VNDN environment and to compare it with existing approaches. A mesh topology, a 5,000-meter bidirectional highway, and 9 RSUs equipped with IEEE 802.11p wireless technology (WAVE) were considered. To generate realistic autonomous vehicle mobility patterns, the locations of the vehicles were randomly distributed, and the simulation of urban mobility (SUMO) traffic simulator was used within the simulation environment. The simulation scenario more accurately reproduces real traffic conditions, and FIG. 6, which captures the dynamic and heterogeneous movements of autonomous vehicles in an urban environment, conceptually illustrates the placement and relationships among the various components used in the simulation.

The density of autonomous vehicles varied from 10 to 200 vehicles, consisting of consumer autonomous vehicles (25%), intermediate autonomous vehicles (50%), and content producer autonomous vehicles (25%). Autonomous vehicles moved according to a random waypoint mobility model, with speeds ranging from 1 m/s to 100 m/s, simulating a dynamic urban scenario. Each RSU periodically exchanged beacons with nearby connected autonomous vehicles and other RSUs to share useful information. In each iteration, each consumer vehicle generated between 0 and 4 interest packets and propagated them through the network to retrieve data packets containing the requested content. Each RSU was equipped with caching functionality in the network, storing temporary copies of returned data packets in the local RSU cache. The buffer size was set to 100 packets, with maximum, minimum, and optimal thresholds configured at 80, 20, and 50 packets, respectively. Network load varied between 0.3 and 0.9. The simulation ran for 500 seconds, including a 50-second warm-up period. The Monte Carlo simulation was conducted by repeating random seed values 1,000 times over 1,000 iterations to ensure statistical reliability, with results verified within a 95% confidence interval. The performance of the proposed framework was evaluated using various metrics, including interest satisfaction rate, average end-to-end delay, network overhead, and data delivery ratio. These evaluations were performed under varying autonomous vehicle densities, interest rates, and mobility patterns. The results, compared with existing partitioning approaches, demonstrate that the proposed framework effectively improves overall network performance and enables efficient mobility management in dense autonomous VNDN environments. Simulation parameters and their corresponding values are presented in Table 5.

TABLE 5

| Parameter | Value |
|---|---|
| Simulator | nbnSIM |
| Traffic Simulator | SUMO |
| Topology | Mesh |
| Coverage Area | 5000 m |
| Number of RSUs | 9 |
| Radio Technology (WAVE) | IEEE 802.11p |
| RSU Range | 300 m |
| Number of Vehicles | 10-200 |
| Vehicle Speed | 1-100 m/s |
| Vehicle Location | Random |
| Mobility Model | Random Waypoint |
| Interest rate | 0-4 interest/consumer |
| Buffer Size | 100 Packets |
| Maximum Threshold | 80 Packets |
| Minimum Threshold | 20 Packets |
| Optimal Threshold | 50 Packets |
| Network Load | 0.3-0.9 |
| Simulation Time | 500 seconds |
| Warmup Time | 50 seconds |
| Confidence Interval | 95% |
| Number of Iterations | 1000 |

Figure 7:
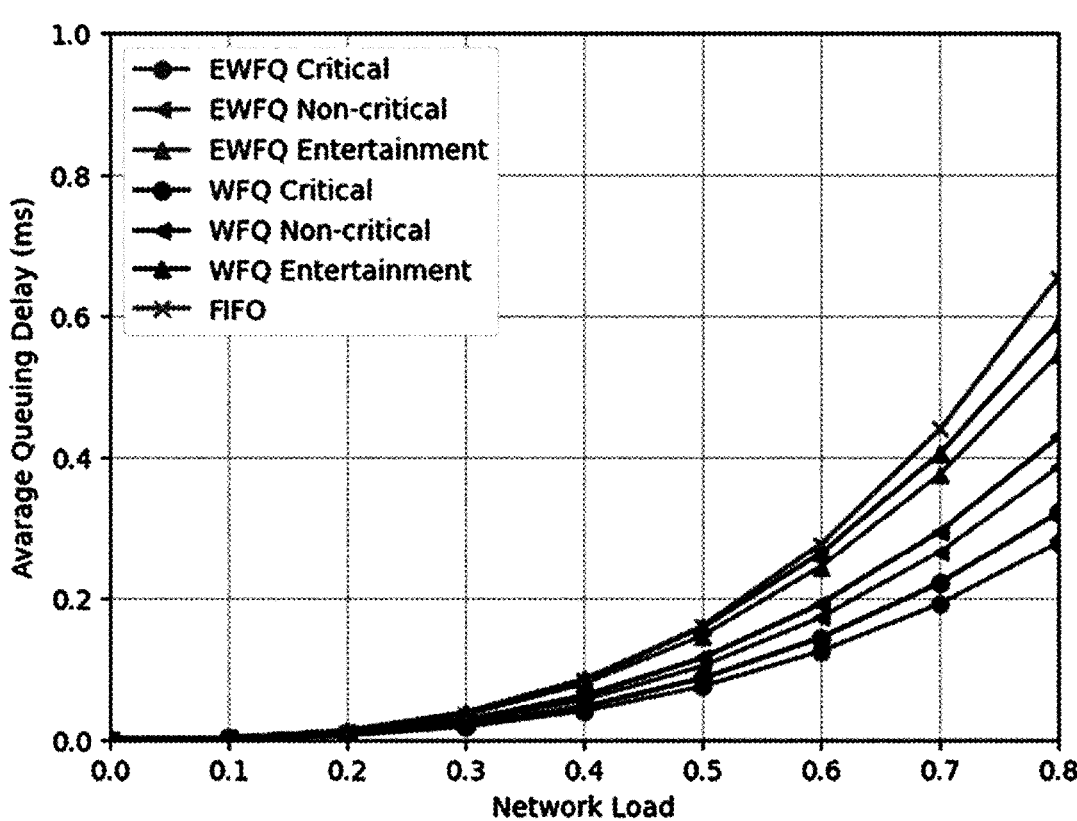
FIG. 7 is a diagram illustrating the relationship between network load and queuing delay for various schedulers and priority levels.

FIG. 7 is a diagram illustrating the relationship between network load and queuing delay for various schedulers and priority levels.

FIG. 7 shows the average queuing delay of EWFQ, WFQ, and FIFO schedulers under increasing network load. In the EWFQ approach, three priority classes of critical, non-critical, and entertainment are considered. The proposed EWFQ achieves the lowest delay across all loads for all data types in the autonomous driving environment compared to WFQ and FIFO. The main conclusion is that EWFQ optimizes the queuing delay of critical, non-critical, and entertainment data through priority-based scheduling.

FIG. 8A to FIG. 8D are diagrams illustrating performance comparisons among the framework of the present invention with EKF-based mobility management and adaptive forwarding, the framework with adaptive forwarding only without EKF-based mobility management, and a simple VNDN scheme.

Figure 8A:
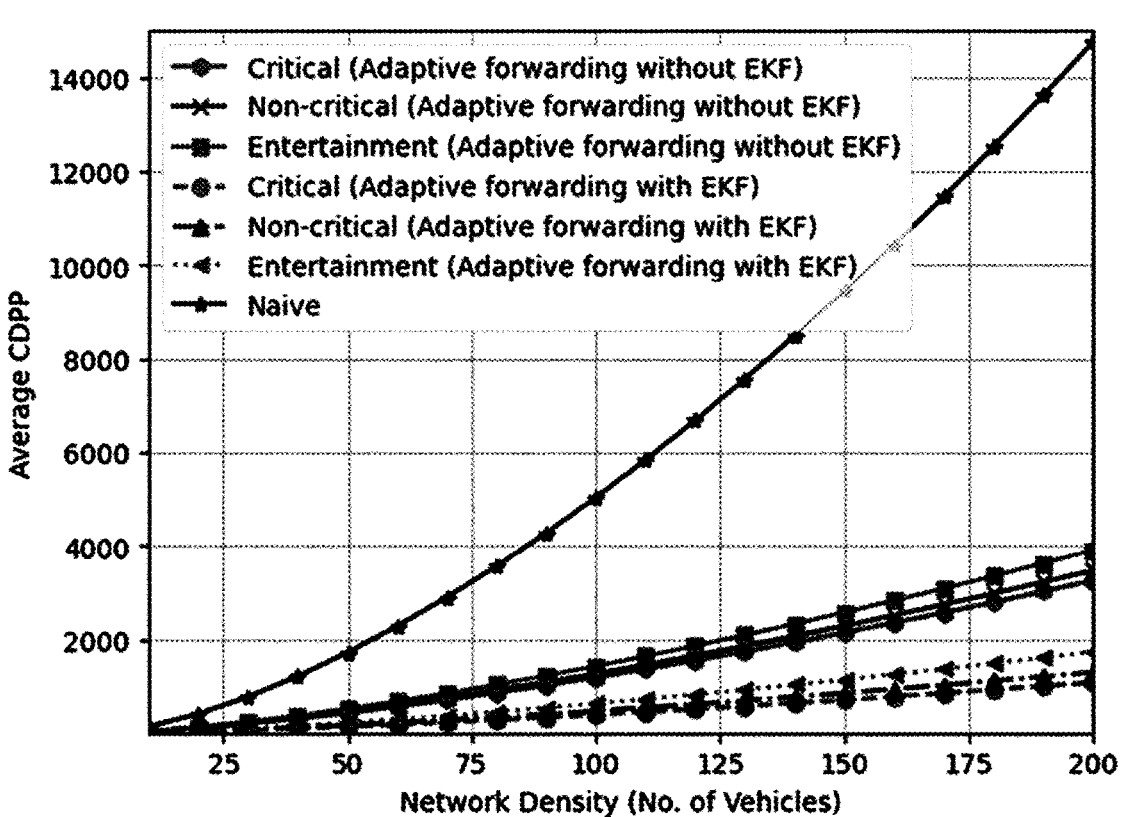
FIG. 8A to FIG. 8D are diagrams illustrating performance comparisons among the framework of the present invention with EKF-based mobility management and adaptive forwarding, the framework with adaptive forwarding only without EKF-based mobility management, and a simple VNDN scheme.

FIG. 8A to FIG. 8D attempt to validate the potential of the framework in a VNDN environment. FIG. 8A shows the average CDPP according to the number of autonomous vehicles for critical, non-critical, and entertainment data types. The CDPP (copies of data packet processed) metric measures the number of duplicate copies of data packets processed by autonomous vehicles while being transmitted across the network. For all data types, adaptive forwarding combined with EKF-based mobility management significantly improves CDPP, gradually increasing from 22 to 1,736 as the vehicle density rises from 10 to 200. In contrast, when adaptive forwarding is used without EKF-based mobility management, critical data sharply increases from 42 to 3,255, non-critical data from 45 to 3,472, and entertainment data from 50 to 3,906.

Figure 8B:
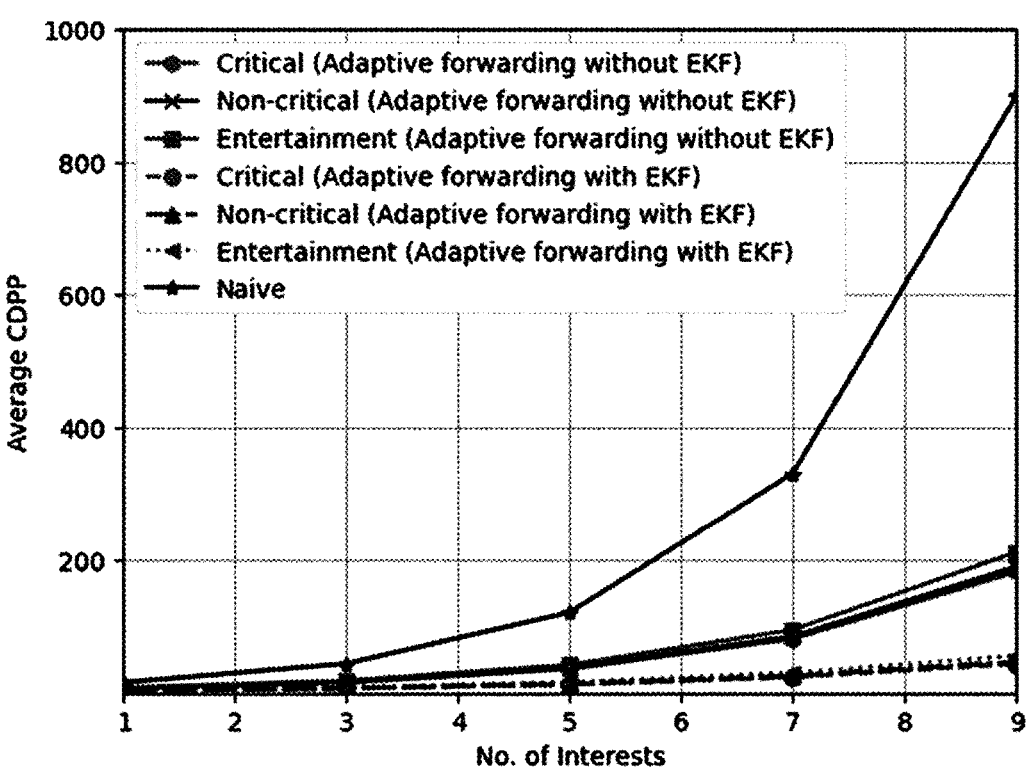

FIG. 8B shows the increase in average CDPP according to the number of interest packets. For critical data, when only adaptive forwarding is applied, CDPP increases from 7 to 183. However, adaptive forwarding with EKF-based mobility management reduces CDPP for all data types by optimizing forwarding through EKF tracking. For example, with 5 interest packets, the CDPP of critical data is 37 without EKF but decreases to 13 with EKF support.

Figure 8C:
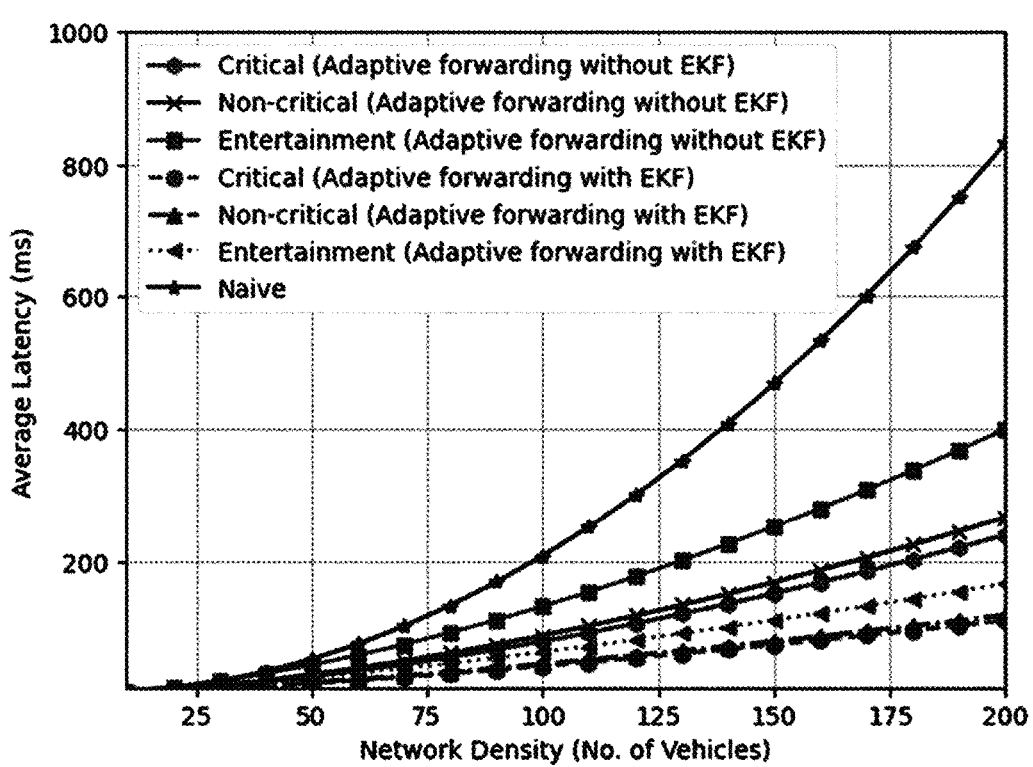

FIG. 8C shows the average delay according to the number of autonomous vehicles. Average delay refers to the time taken for data packets to be transmitted from producers (autonomous vehicles or information sources) to consumers (autonomous vehicles) in the VNDN environment. When only adaptive forwarding is used for critical data, the delay increases from 2 ms to 240 ms. In contrast, adaptive forwarding with EKF-based mobility management reduces the delay from 1.6 ms to 111 ms. Optimizing forwarding through EKF tracking significantly decreases delay regardless of the data type. For example, with 100 autonomous vehicles, the delay of critical data is 79 ms without EKF support, but decreases to 45 ms with EKF optimization. The main reason is that EKF enables accurate tracking of autonomous vehicles. Adaptive forwarding with EKF transmits data packets through more optimized paths, thereby optimizing the mitigation of data broadcast storms. In contrast, simple VNDN diffusion allows only pull-based forwarding without mobility awareness, causing data broadcast storms and resulting in higher delays.

Figure 8D:
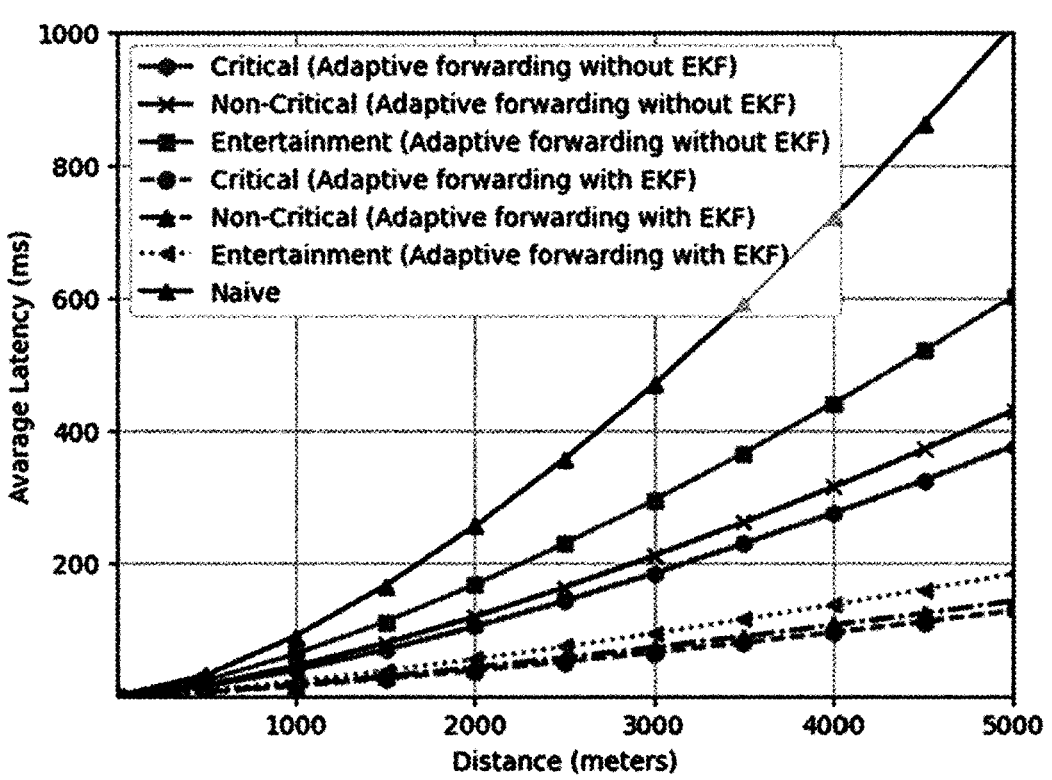

FIG. 8D shows that the adaptive forwarding strategy combined with EKF-based mobility management improves the delay for all data types as distance increases. For example, at a distance of 2,000 meters, the delay of critical data is 104 ms without EKF support, but decreases to 39 ms with EKF support. In contrast, the naive VNDN approach exhibits a high delay of 256 ms at the distance of 2,000 m.

As shown in the results of FIG. 8A through FIG. 8D, integrating adaptive forwarding with EKF-based mobility management is essential for efficient and reliable data distribution in dynamic autonomous VNDN environments.

FIG. 9A to FIG. 9D are diagrams illustrating performance comparisons between EPDF and a conventional fragment-based scheme at vehicle speed ranges of 70 to 100 km/h.

FIG. 9A to FIG. 9D present the key performance metrics of the proposed EPDF method in comparison with existing approaches, namely NameCent, CODIE, and simple VNDN.

FIG. 9A shows the CDPP values as network density increases. The proposed EPDF consistently demonstrates lower CDPP values than other methods, indicating more efficient data transmission.

Figure 9B:
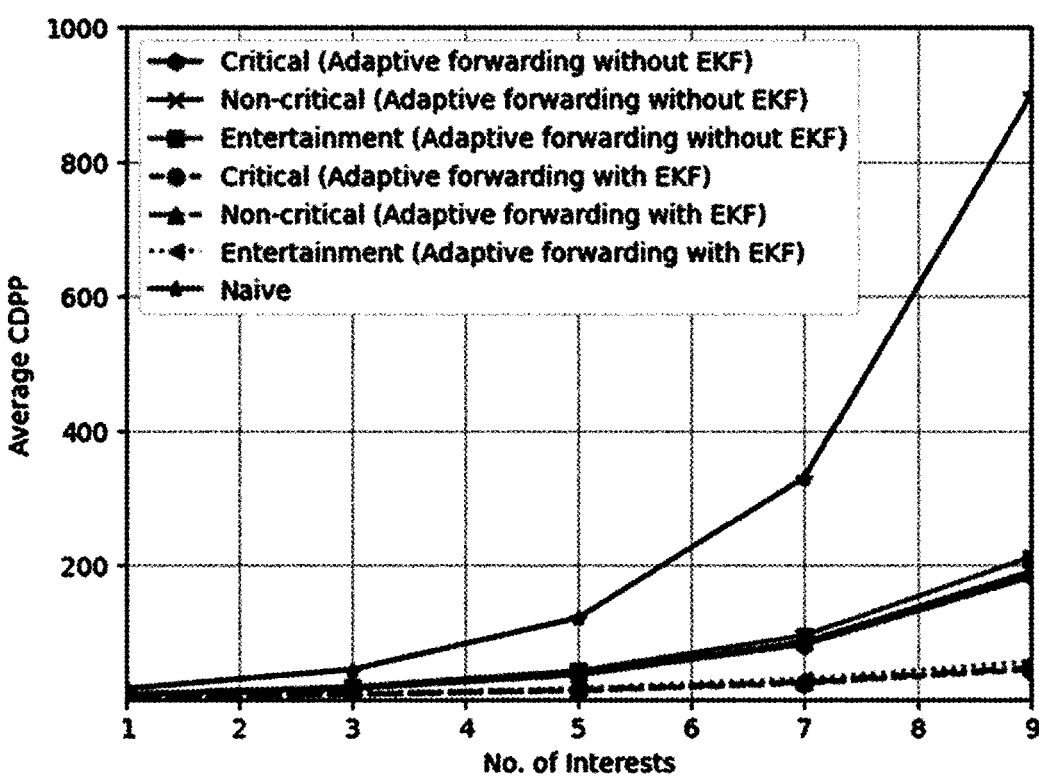

FIG. 9B illustrates the interest satisfaction rate (ISR), which represents the proportion of data packets successfully transmitted during data requests. EPDF consistently achieves higher ISR, demonstrating superior data delivery success ratio.

Figure 9C:
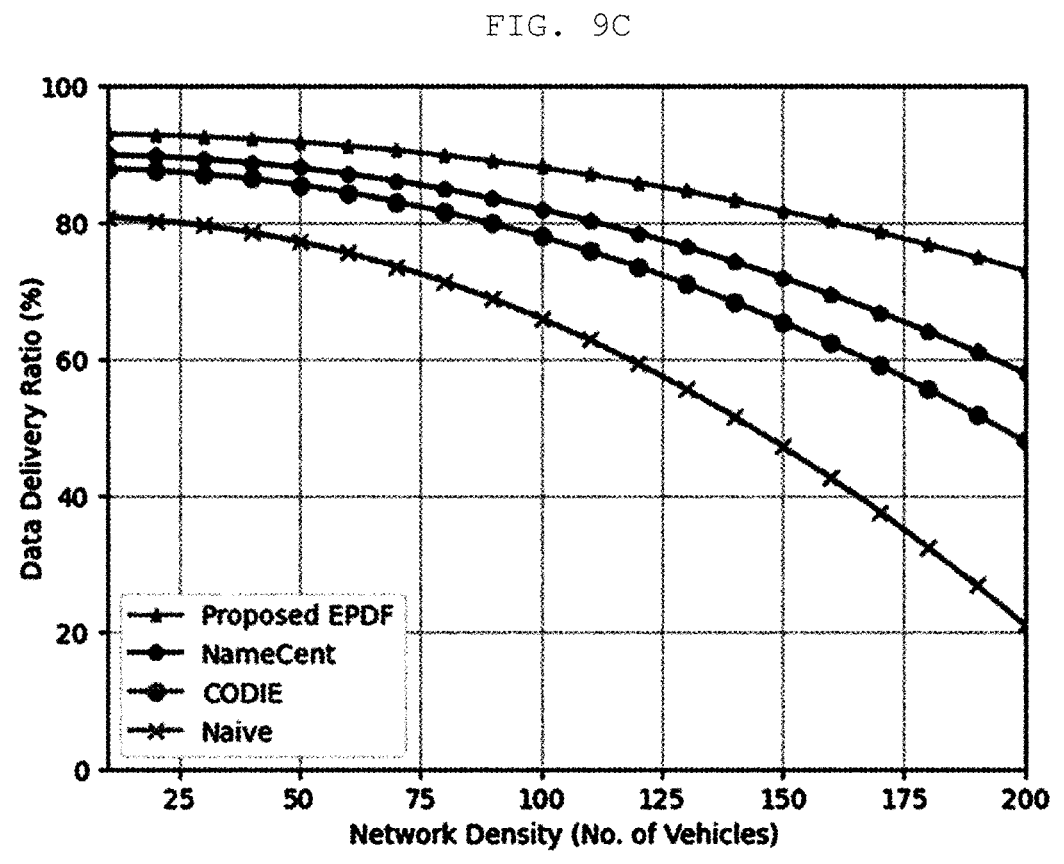

FIG. 9C shows a data delivery ratio (DDR). This indicates the proportion of transmitted data packets. By selecting optimal paths and more reliable forwarders, EPDF mitigates data broadcast storms more effectively and consistently outperforms other methods.

Figure 9D:
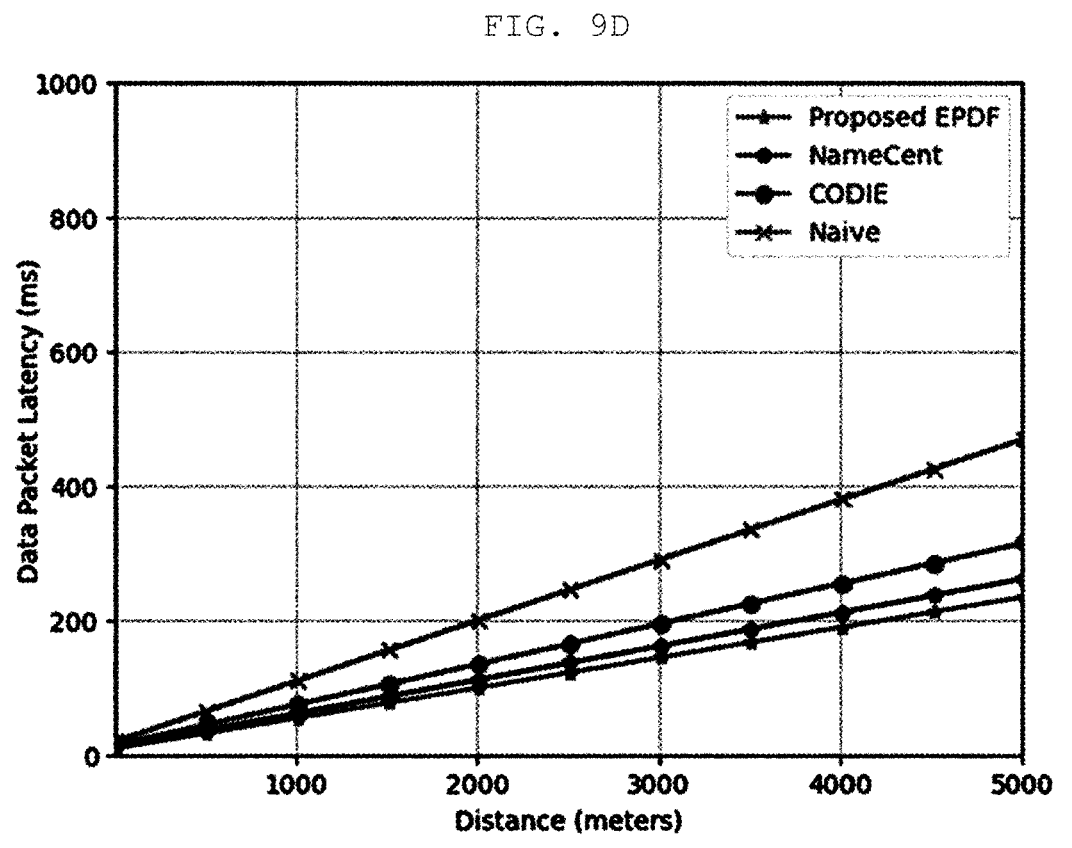

FIG. 9D shows a data packet latency (DPL). This indicates the average time taken for data packet transmission. EPDF consistently demonstrates lower latency, which represents the average time required for data packet transmission. EPDF ensures timely forwarding of data by consistently exhibiting lower latency.

Overall, FIG. 9A to FIG. 9D highlight that our EPDF approach consistently outperforms other methods in terms of CDPP, ISR, DDR, and DPL, thereby emphasizing its efficiency and effectiveness in VNDN environments.

Figure 10B:
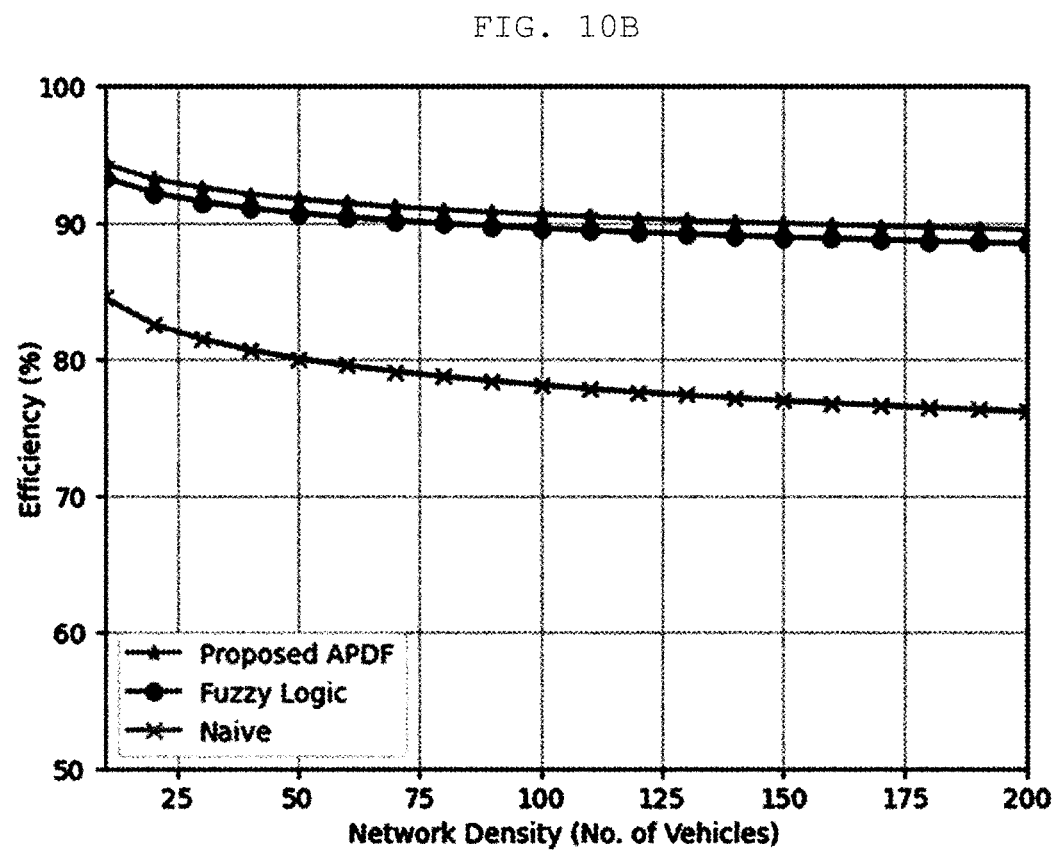

FIG. 10A and FIG. 10B are diagrams illustrating data forwarding performance comparisons between APDF of the present invention and conventional schemes at an average speed of 80 km/h.

FIG. 10A shows the comparison of CDPP values among three data forwarding approaches (the proposed APDF, fuzzy logic, and simple VNDN). The results are presented with increasing network density, with an average autonomous vehicle speed of 80 km/h. The proposed APDF achieves significantly lower CDPP values compared to fuzzy logic and simple VNDN. This is because the proposed APDF optimizes the selection of the next forwarder.

In contrast, the fuzzy logic approach employs a cluster head, which is prone to failure due to the mobility of autonomous vehicles. Compared to VNDN, the proposed APDF achieves substantially lower CDPP values. This is because it selects the optimal next forwarder and only the optimal forwarder broadcasts the information data. In contrast, the fuzzy logic approach employs a cluster head, which is prone to failure due to the mobility of autonomous vehicles. By selecting the optimal forwarder, APDF ensures that the network is not overloaded with unnecessary broadcast messages, thereby achieving more efficient and reliable data dissemination.

FIG. 10B compares the efficiency of the proposed APDF, fuzzy logic, and simple VNDN schemes under increasing network density. Efficiency is defined as the ratio of vehicles that successfully receive the forwarded information data. The results show that the proposed APDF achieves higher efficiency than the other two schemes across all network densities. The improved efficiency of APDF stems from its optimal next-forwarder selection and its adaptation to changes in network density. This provides greater robustness in highly dynamic VNDN environments.

Overall, FIG. 10A and FIG. 10B demonstrate that the proposed APDF scheme excels in minimizing redundant transmissions and achieving higher efficiency.

Figure 11A:
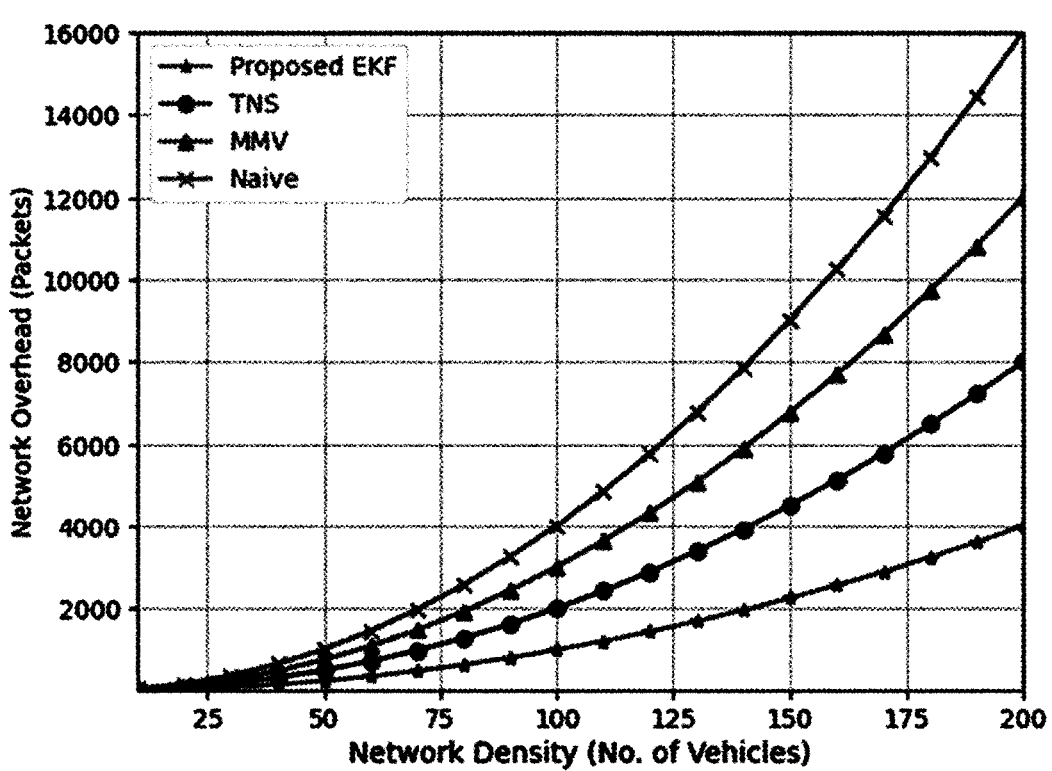
Figure 11B:
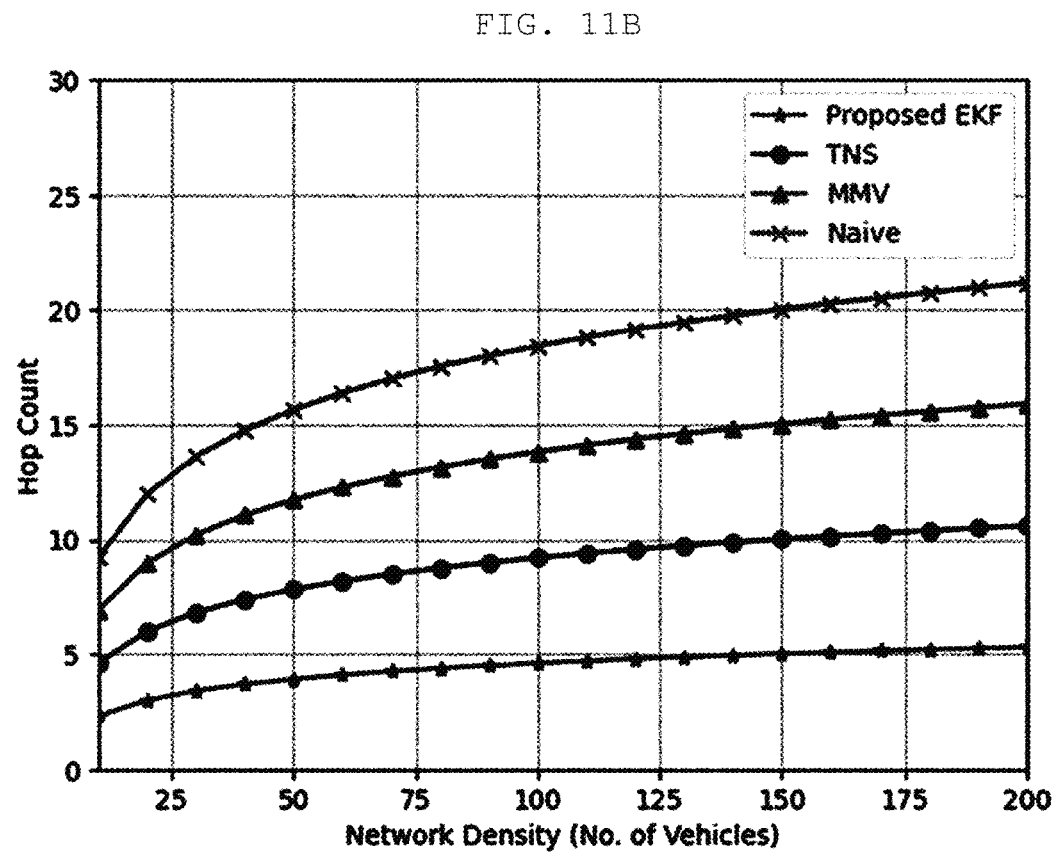

FIG. 11A and FIG. 11B are diagrams illustrating performance comparisons between EKF and conventional schemes at an average speed of 80 km/h.

The results shown in FIG. 11A and FIG. 11B were obtained by considering mobility management for pull-based traffic in VNDN. The proposed framework utilized EKF-based mobility management together with EPDF, while TNS and MMV employed their respective mobility management approaches and data forwarding mechanisms. The simple VNDN scheme used the basic data forwarding method without any mobility management mechanism.

FIG. 11A shows the network overhead varying with network density. The average speed of autonomous vehicles was assumed to be 80 km/h. Network overhead is defined as the total number of packets generated and transmitted during the network dissemination process. The results demonstrate that the proposed EKF scheme produces lower network overhead during vehicle mobility compared to other schemes. The performance improvement of EKF is attributed to the enhanced accuracy of location prediction of the autonomous vehicle and the increased handover speed between RSUs. This minimizes the number of data packets due to improved mobility management. In contrast, the higher network overhead of TNS and MMV indicates frequent handovers and connection losses. This reduction is due to the utilization of a modified data packet format that includes attributes such as class and weight. Periodic beacon exchanges eliminate unnecessary data packet transmissions during movement of autonomous vehicles, enabling more efficient data forwarding decisions.

FIG. 11B compares the hop count of the proposed EKF with conventional mobility management schemes such as TNS, MMV, and simple VNDN. The results show that the proposed EKF approach records the lowest hop count as network density increases. By accurately tracking the locations of autonomous vehicles, the proposed EKF minimizes the hop count by sharing the PIT or FIB with the next RSU. In contrast, inaccurate location prediction and slow handover in conventional schemes lead to suboptimal routing and longer paths. Overall, the proposed EKF minimizes the hop count by sharing the PIT or FIB with the next RSU.

On the other hand, the inaccurate location prediction and slow handover of conventional schemes result in suboptimal paths and longer paths. Overall, FIG. 11A and FIG. 11B demonstrate that the proposed EKF reduces data packet redundancy through accurate location prediction of autonomous vehicles and seamless handovers between RSUs. This reduces both network overhead and hop count.

In the present invention, there was proposed the first comprehensive framework that enables complete infotainment services in highly dynamic autonomous VNDN environments. By inserting class attributes into the data packet format, data are classified into critical, non-critical, and entertainment classes. To meet diverse QoS requirements, there was proposed an enhanced weighted fair queuing (EWFQ) scheduler. EWFQ scheduling improves the latency and reliability of critical information data. An adaptive push/pull distribution strategy is proposed for the first time for selective forwarding according to content type. Proactive mobility prediction using the extended Kalman filter (EKF) is proposed to track consumer/producer vehicle locations and provide seamless handovers. This ensures uninterrupted connectivity during consumer/producer vehicle movement. Simulation results demonstrate that the proposed framework outperforms the conventional fragmented VNDN approach. Compared to the conventional partition-based VNDN, it shows superior performance in terms of reducing redundant data, lowering overhead, improving data forwarding, and reducing latency.

Figure 12:
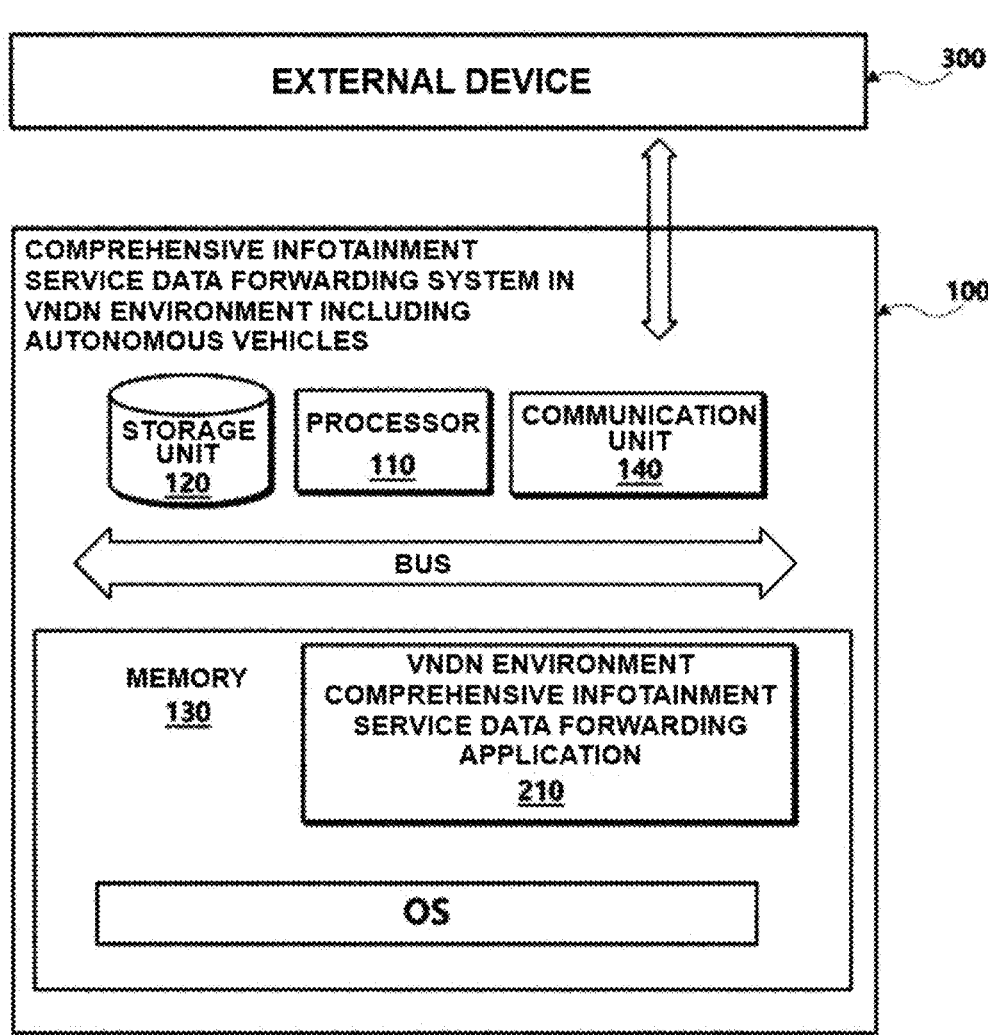
FIG. 12 is a diagram illustrating a configuration of a comprehensive infotainment service data forwarding system in a VNDN environment including autonomous vehicles.

FIG. 12 is a diagram illustrating a configuration of a comprehensive infotainment service data forwarding system 100 in a VNDN environment including autonomous vehicles.

The comprehensive infotainment service data forwarding system 100 in a VNDN environment including autonomous vehicles includes a processor 110, a non-volatile storage unit 120 for storing programs and data, a volatile memory 130 for storing programs during execution, a communication unit 140 for communicating with external devices 300, and a bus serving as an internal communication pathway between these components. The programs being executed may include device drivers, an operating system (OS), and various applications. Although not illustrated, the comprehensive infotainment service data forwarding system 100 in a VNDN environment including autonomous vehicles may further include a power supply unit such as a battery.

The VNDN environment infotainment service data forwarding application 210 is a program installed and operated in the comprehensive infotainment service data forwarding system 100 in a VNDN environment including autonomous vehicles, and, with reference to FIG. 1 to FIG. 11B, performs data forwarding for infotainment services in such an environment as described above.

Thus, according to the method for performing data forwarding using classified queues for comprehensive infotainment services according to the present invention, various types of data traffic occurring in an autonomous driving environment (e.g., emergency safety alerts, traffic information, multimedia content) are effectively classified into critical information queues, non-critical information queues, and entertainment data queues, and differentiated QoS is provided for each queue and packet, thereby ensuring the rapid and reliable forwarding of data essential for autonomous driving safety.

Further, by using a fuzzy logic system to comprehensively consider the dynamic and complex conditions of the autonomous driving environment, such as the arrival time, priority level, link quality, and network density of each data packet, a queuing weight is dynamically computed for each packet, and based on this weight, the forwarding output order of the packets is determined, thereby enabling a significantly more flexible and intelligent QoS management compared to conventional static queuing methods.

In addition, the proposed fuzzy logic-based EWFQ queuing policy significantly improves the average queuing delay compared to conventional FIFO or WFQ queuing techniques, providing enhanced performance and clear QoS differentiation in terms of queuing delay for critical information, non-critical information, and entertainment data, thereby substantially enhancing the real-time responsiveness of the autonomous driving system and the overall network efficiency.

In conclusion, the present invention, by proposing the first intelligent queuing technique capable of meeting diverse service requirements in a VNDN environment to ensure communication QoS essential for the safe and efficient operation of autonomous vehicles, can serve as a core technology for vehicle communication infrastructure in the era of autonomous driving.

Meanwhile, according to the method for performing adaptive data forwarding for comprehensive infotainment services of the present invention, various types of data traffic occurring in an autonomous driving environment (e.g., emergency safety alerts, traffic information, multimedia content) can be clearly distinguished through class attributes, and push-based APDF or pull-based EPDF forwarding strategies can be selectively applied according to the characteristics of each data type, thereby simultaneously achieving rapid dissemination of information critical for autonomous driving safety and efficient provision of high-quality entertainment services.

Furthermore, within the APDF and EPDF mechanisms, a weight-based forwarder selection method reflecting the dynamic characteristics of the autonomous driving environment effectively mitigates broadcast storms of information and entertainment data packets and minimizes unnecessary duplicate transmissions to maximize the efficiency of network resources.

Furthermore, the proposed integrated adaptive forwarding method, compared with conventional single forwarding schemes or separate service provisioning approaches, significantly improves overall network performance by reducing data redundancy, lowering network overhead, enhancing scalability, shortening data packet latency, and increasing data delivery ratio and interest satisfaction rate, thereby enhancing the communication reliability and responsiveness of autonomous driving systems and providing passengers with an improved infotainment experience.

In conclusion, the present invention, in order to meet the complex requirements of ensuring that autonomous vehicles operate safely and efficiently while simultaneously providing rich infotainment services, proposes, for the first time, a core adaptive forwarding method that integrally manages information and entertainment services and provides optimal forwarding paths in a VNDN environment, thereby establishing itself as a key technology for future intelligent transportation systems and autonomous driving communication platforms.

While the present invention has been described with respect to the specific embodiments, it will be apparent to those skilled in the art that various changes and modifications may be made without departing from the spirit and scope of the invention as defined in the following claims.

What is claimed is:

1. A method for performing data forwarding using queues classified for comprehensive infotainment services by an autonomous vehicle or a road side unit (RSU) in a vehicular named data networking (VNDN) environment including autonomous vehicles, the method comprising: generating or receiving a data packet by the autonomous vehicle or road side unit (RSU); placing the data packet, according to a class attribute included in the data packet, into a separate queue classified based on the class attribute; computing a current node weight (CNW) for the data packet and including the computed weight value in a weight attribute of the data packet;

determining a forwarding order of the data packet according to the computed current node weight; and forwarding the data packet according to the determined order.

2. The method according to claim 1, wherein the class attribute is classified into critical, non-critical, and entertainment.

3. The method according to claim 2, wherein the critical attribute includes one or more of emergency alerts, traffic alerts, road alerts, accident alerts, hazardous warnings, construction alerts, speed limit alerts, lane closure alerts, disaster warnings, security alerts, and health alerts.

4. The method according to claim 2, wherein the non-critical attribute includes one or more of navigation, weather updates, real-time traffic information, gas station information, traffic signal information, and speed limit information.

5. The method according to claim 2, wherein the entertainment attribute includes one or more of music, video, radio, podcasts, video calls, e-books, news, social media, live streaming, and virtual reality.

6. The method according to claim 1, wherein the current node weight (CNW) is computed as: wherein RSSIin denotes a received signal strength indication of vehicle n for packet i, Din denotes the direction of vehicle n for packet i, Vin denotes the speed of vehicle n for packet i, HCin denotes a hop count of packet i through vehicle n, $\alpha1$, $\alpha2$, $\alpha3$, and $\alpha4$ are coefficients for adjusting the importance of each parameter, and HCin denotes a node centrality of vehicle n for information packet i when the class attribute is critical or non-critical, or a name centrality representing the number of interest packets received from vehicle n for entertainment data packet i when the class attribute is entertainment.

7. The method according to claim 1, further comprising: acquiring a received signal strength (RSS), GPS coordinates of the current node autonomous vehicle, and a speed value;

computing an estimated location of the current node autonomous vehicle by using an extended Kalman filter (EKF);

acquiring a received signal strength value from a new road side unit (RSU) when the estimated location is not within a range of the same RSU as before; and forwarding vehicle information and a PIT/FIB table to the new RSU when the received signal strength value of the new RSU is greater than that of the previous RSU.

8. A method for performing adaptive data forwarding for comprehensive infotainment services by an autonomous vehicle or a road side unit (RSU) in a vehicular named data networking (VNDN) environment including autonomous vehicles, the method comprising: generating or receiving a data packet by the autonomous vehicle or road side unit (RSU); classifying the data packet according to a class attribute included in the data packet; computing a current node weight (CNW) for the data packet including the class attribute from parameters for weight computation, and including the computed weight value into a weight attribute of the data packet; determining a forwarding order of the data packet according to the computed current node weight; and forwarding the data packet according to the determined order, wherein the parameters for the weight computation include one or more pieces of information among priority, link quality, network density, and arrival time information, and the current node weight is computed by a fuzzy logic system using the parameters for weight computation as input variables.

9. The method according to claim 8, wherein the fuzzy logic system is configured to: convert the network state parameters into fuzzy sets through a fuzzifier; derive a fuzzy output value by applying fuzzy rules predetermined in an inference engine; and convert the fuzzy output value into the dynamic queuing weight through a defuzzifier.

10. A system performing data forwarding in a vehicular named data networking (VNDN) environment including autonomous vehicles, the system comprising: at least one processor; and at least one memory storing computer-executable instructions, wherein the computer-executable instructions stored in the at least one memory cause the at least one processor to perform: generating or receiving a data packet; placing the data packet, according to a class attribute included in the data packet, into a separate queue classified based on the class attribute; computing a current node weight (CNW) for the data packet and including the computed weight value in a weight attribute of the data packet; determining a forwarding order of the data packet according to the computed current node weight; and forwarding the data packet according to the determined order, and the system further comprising adaptive data forwarding for comprehensive infotainment services in a vehicular named data networking (VNDN) environment including autonomous vehicles.

11. The system according to claim 10, wherein the system is installed in an autonomous vehicle or a road side unit (RSU) for performing adaptive data forwarding for comprehensive infotainment services in a vehicular named data networking (VNDN) environment including autonomous vehicles, the system is caused to forward the data packet according to the determined order, wherein the parameters for weight computation include one or more pieces of information among priority, link quality, network density, and arrival time information, and the current node weight is computed by a fuzzy logic system using the parameters for weight computation as input variables.

12. A computer program stored on a computer-readable non-transitory storage medium for providing data forwarding in a vehicular named data networking (VNDN) environment including autonomous vehicles, the computer program being stored on the non-transitory storage medium and including instructions, which cause a processor to execute: generating or receiving a data packet; placing the data packet, according to a class attribute included in the data packet, into a separate queue classified based on the class attribute; computing a current node weight (CNW) for the data packet and including the computed weight value in a weight attribute of the data packet; determining a forwarding order of the data packet according to the computed current node weight; and forwarding the data packet according to the determined order; and performing adaptive data forwarding for comprehensive infotainment services in a vehicular named data networking (VNDN) environment including autonomous vehicles.

13. The computer program according to claim 12, wherein the parameters for weight computation include one or more pieces of information among priority, link quality, network density, and arrival time information, and the current node weight is computed by a fuzzy logic system using the parameters for weight computation as input variables.

\* \* \* \* \*